United States Patent
Zhang et al.

(10) Patent No.: US 11,626,952 B2
(45) Date of Patent: Apr. 11, 2023

(54) SIGNAL CONFIGURATION METHOD AND RELATED DEVICE

(71) Applicant: HUAWEI TECHNOLOGIES CO., LTD., Shenzhen (CN)

(72) Inventors: Lili Zhang, Beijing (CN); Guorong Li, Shenzhen (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 0 days.

(21) Appl. No.: 16/757,347

(22) PCT Filed: Oct. 23, 2018

(86) PCT No.: PCT/CN2018/111307
§ 371 (c)(1),
(2) Date: Apr. 17, 2020

(87) PCT Pub. No.: WO2019/080817
PCT Pub. Date: May 2, 2019

(65) Prior Publication Data
US 2021/0194654 A1   Jun. 24, 2021

(30) Foreign Application Priority Data

Oct. 23, 2017  (CN) .................. 201710994678.X
Jan. 29, 2018  (CN) .................. 201810085426.X

(51) Int. Cl.
*H04L 5/00*  (2006.01)
*H04B 7/06*  (2006.01)
(Continued)

(52) U.S. Cl.
CPC ......... *H04L 5/0051* (2013.01); *H04B 7/0628* (2013.01); *H04B 7/0695* (2013.01);
(Continued)

(58) Field of Classification Search
CPC ............... H04L 25/0224; H04L 27/2613
See application file for complete search history.

(56) References Cited

U.S. PATENT DOCUMENTS

2012/0257513 A1* 10/2012 Yamada ............... H04W 88/08
                                                   370/328
2013/0250847 A1*  9/2013 Lee ..................... H04L 5/0051
                                                   370/315
(Continued)

FOREIGN PATENT DOCUMENTS

CN   101925130 A   12/2010
CN   102246429 A   11/2011
(Continued)

OTHER PUBLICATIONS

3GPP TS 36.213 V14.4.0 (Sep. 2017),3rd Generation Partnership Project Technical Specification Group Radio Access Network;Evolved Universal Terrestrial Radio Access (E-UTRA); Physical layer procedures(Release 14),total 461 pages.
(Continued)

*Primary Examiner* — Ayaz R Sheikh
*Assistant Examiner* — Debebe A Asefa
(74) *Attorney, Agent, or Firm* — Stein IP, LLC

(57) ABSTRACT

A signal configuration method and a related device, wherein a network device determines configuration information that is on a second carrier and/or a second beam and that is used to transmit a sounding reference signal SRS; and sends the configuration information to a terminal device, so that the terminal device switches, based on the configuration information, the SRS from a first carrier and/or a first beam to the second carrier and/or the second beam for transmission The configuration information includes at least one of symbol information, slot information, and/or frequency band information, a communications parameter of the first carrier and a communications parameter of the second carrier are the
(Continued)

same or different, and the communications parameter includes a subcarrier spacing and/or a waveform parameter. Accordingly, correct SRS configuration can be ensured to some extent.

14 Claims, 7 Drawing Sheets

(51) Int. Cl.
  *H04W 72/04* (2009.01)
  *H04W 72/08* (2009.01)
  *H04W 72/0453* (2023.01)

(52) U.S. Cl.
  CPC ............ *H04L 5/001* (2013.01); *H04L 5/0053* (2013.01); *H04L 5/0094* (2013.01); *H04W 72/042* (2013.01); *H04W 72/0453* (2013.01); *H04W 72/085* (2013.01)

(56) References Cited

U.S. PATENT DOCUMENTS

| | | | |
|---|---|---|---|
| 2016/0014701 A1 | 1/2016 | Nam et al. | |
| 2018/0098358 A1* | 4/2018 | Rico Alvarino | H04L 5/0092 |
| 2018/0248616 A1* | 8/2018 | Tiirola | H04W 72/1205 |
| 2020/0145079 A1* | 5/2020 | Marinier | H04B 7/024 |
| 2020/0280337 A1* | 9/2020 | Yi | H04L 1/1861 |

FOREIGN PATENT DOCUMENTS

| | | |
|---|---|---|
| CN | 102934382 A | 2/2013 |
| CN | 103814544 A | 5/2014 |
| CN | 105577338 A | 5/2016 |
| JP | 2019514268 A | 5/2019 |
| JP | 2020530672 A | 10/2020 |
| WO | 2015163709 A1 | 10/2015 |
| WO | 2017173388 A1 | 10/2017 |

OTHER PUBLICATIONS

Huawei et al.,"SRS switching among CCs and bandwidth parts", 3GPP TSG RAN WG1 NR Ad-Hoc Meeting, R1-1709976, Qingdao, China, Jun. 27-30, 2017, total 4 pages.

Huawei et al.,"UL SRS design for beam management and CSI acquisition", 3GPP TSG RAN WG1 Meeting #90bis, R1-1717307, Prague, Czech Republic, Oct. 9-13, 2017, total 13 pages.

Huawei et al.,"UL SRS design for beam management and CSI acquisition", 3GPP TSG RAN WG1 NR Ad Hoc Meeting, R1-1709936, Qingdao, China, Jun. 27-30, 2017, total 8 pages.

Huawei et al.,"UL SRS design for beam management, CSI acquisition", 3GPP TSG RAN WG1 Meeting #89, R1-1706938, Hangzhou, China, May 15-19, 2017, total 9 pages.

Nokia et al,"SRS design considerations in NR", 3GPP TSG RAN WG1 Meeting #90 R1-1714259, Prague, Czech Republic, Aug. 21-25, 2017, total 6 pages.

Huawei, HiSilicon, SRS switching among CCs and bandwidth parts, 3GPP TSG RAN WG1 #90b, R1-1718251, Oct. 13, 2017, 6 pages.

Samsung, SRS design for NR, 3GPP TSG RAN WG1 adhoc#2, R1-1710688, Jun. 30, 2017, 6 pages.

CATT, Further discussion on remaining issues on SRS, 3GPP TSG RAN WG1 #90b, R1-1717820, Oct. 13, 2017, 5 pages.

R1-1804284, Huawei et al, SRS carrier switching involving SUL, 3GPP TSG-RAN WG1 Meeting #92bis, Sanya, China, Apr. 16-20, 2018, total 4 pages.

Sony, Summary of SRS, 3GPP TSG RAN WG1 Meeting 90bis, R1-1718980Prague,CZ, Oct. 9-13, 2017, 12 pages.

R1-1718901, MediaTek Inc., Summary of Bandwidth Part Operation, 3GPP TSG RAN WG1 Meeting 90bis, Prague, CZ, Oct. 9-13, 2017, total 14 pages.

Huawei et al.,"Other issues on NR CA and DC including SRS switching and SUL", 3GPP TSG RAN WG1 Meeting #90bis , R1-1717080, Prague, Czech Republic, Oct. 9-13, 2017, total 9 pages.

\* cited by examiner

SIGNAL CONFIGURATION METHOD AND RELATED DEVICE

CROSS-REFERENCE TO RELATED APPLICATIONS

This application is a National Stage of International Application No. PCT/CN2018/111307, filed on Oct. 23, 2018, which claims priority to Chinese Patent Application No. 201810085426.X, filed on Jan. 29, 2018 and Chinese Patent Application No. 201710994678.X, filed on Oct. 23, 2017. All of the aforementioned applications are hereby incorporated by reference in their entireties.

TECHNICAL FIELD

Aspects of the present invention relate to the field of communications technologies, and in particular, to a signal configuration method and a related device.

BACKGROUND

A sounding reference signal (SRS) can be used to measure uplink channel quality in different frequency bands, and is an important signal in a communications system. For a carrier or a beam that can be used for both uplink transmission and downlink transmission, a network device may estimate uplink channel quality in different frequency bands by using an SRS, and estimate channel fading that a sent downlink signal is to go through with reference to channel reciprocity (when an interval of an uplink sending time and a downlink sending time is short enough, it may be considered that fading of an uplink channel is basically the same as fading of a downlink channel), to determine downlink channel quality.

However, using a carrier as an example, downlink transmission is performed on but uplink transmission is not performed on some time division duplex (TDD) carriers. Therefore, there is no SRS to be sent. For such a TDD carrier, channel reciprocity cannot be effectively utilized. Therefore, allowing fast carrier switching is proposed, for example, when it is determined that uplink transmission is not performed on a current TDD carrier, and an SRS is switched to another TDD carrier on which uplink transmission is performed, to ensure that the SRS is transmitted on the TDD carrier.

For different carriers, SRS-related configuration information in the fast carrier switching is also different. Configuration information of the SRS may be used to indicate how to configure the SRS to a terminal device. Therefore, how to ensure correct SRS configuration becomes a hot research direction.

SUMMARY

A technical problem to be resolved in this application is how to ensure correct SRS configuration.

According to a first aspect, an embodiment of the present invention provides a signal configuration method. The method may include: determining, by a network device, configuration information that is on a second carrier and/or a second beam and that is used to transmit a sounding reference signal SRS, where the configuration information may include at least one of symbol information, slot information, and/or frequency band information; and sending, by the network device, the configuration information to a terminal device, so that the terminal device switches, based on the configuration information, the SRS from a first carrier and/or a first beam to the second carrier and/or the second beam for transmission, where the first carrier is a carrier from which the SRS is switched, the first beam is a beam from which the SRS is switched, the second carrier is a switched-to carrier used to send the SRS, and the second beam is a switched-to beam used to send the SRS; and a communications parameter of the first carrier and a communications parameter of the second carrier may be the same or may be different, and the communications parameter includes a subcarrier spacing and/or a waveform parameter.

It should be noted that the communications parameter in this application is a numerology. In other words, the communications parameter in this application may be replaced with the numerology, and the numerology may also be replaced with the communications parameter.

It should be further noted that a symbol "/" in this application may represent a meaning of "and/or". In other words, the symbol "/" appearing in this application may also be correspondingly replaced with "and/or", and "and/or" may also be replaced with "/". This is not limited in the embodiments of the present invention.

If SRS carrier transfer is performed, the network device determines configuration information of the second carrier, and the terminal device transfers the SRS from the first carrier to the second carrier for transmission. If SRS beam transfer is performed, the network device determines configuration information of the second beam, and the terminal device transfers the SRS from the first beam to the second beam for transmission.

It can be learned that, by implementing the method described in the first aspect, the network device may indicate configuration information for SRS transmission to the terminal device. Different carriers have different SRS configuration information. Therefore, the network device indicates the configuration information, so that the terminal device can switch, based on the configuration information, the SRS from the first carrier and/or the first beam to the second carrier and/or the second beam for transmission. In this way, correct SRS configuration is ensured when the terminal device performs SRS switching.

In an optional implementation, the configuration information is sent to the terminal device by using physical layer signaling (PHY signaling), radio resource control layer signaling (RRC signaling), or media access control layer signaling (MAC signaling), and the PHY signaling is signaling sent through a group physical downlink control channel (Group PDCCH, group PDCCH for short) or by using group downlink control information (group DCI for short). The group PDCCH carries the group DCI. The group physical downlink control channel may also be referred to as a group common physical downlink control channel (Group Common PDCCH, group common PDCCH for short). The group downlink control information may also be referred to as group common downlink control information (group common DCI.

The group PDCCH is located in group common search space (Group Common Search space, GCSS for short).

In a feasible implementation, the frequency band information may be partial frequency band information or carrier information.

In a feasible implementation, the configuration information may further include a frequency band correspondence, and the frequency band correspondence may include a correspondence between a frequency band and a communications parameter. By using the frequency band correspondence and communications parameters and/or a communications parameter corresponding to the second carrier and/or the second beam, frequency bands/a frequency band on the second carrier and/or the second beam to which the SRS is switched can be determined.

The frequency band may include transmission bandwidth (Band Width Part, BWP).

It can be learned that, by implementing the feasible implementation, the network device may indicate frequency band information to the terminal device, so that the terminal device configures a corresponding frequency band of the SRS on the switched-to second carrier or the switched-to second beam based on an indication. In this way, correct SRS frequency band configuration is ensured.

In a feasible implementation, the symbol information may be used to indicate symbol information in a first time period, and the first time period is a time period determined based on a communications parameter of a third carrier and the communications parameter of the second carrier. The time period may be at least one type or a combination of more than one type of a plurality of slots, a plurality of mini-slots, a plurality of subframes, or a plurality of mini-subframes.

In a feasible implementation, the symbol information may be used to indicate symbol information in a first timing, and the first timing is a timing determined based on the communications parameter of the second carrier. The timing may be at least one or a combination of more than one of a slot, a mini-slot, a subframe, or a mini-subframe.

In a feasible implementation, the symbol information may be used to indicate symbol information determined based on the communications parameter of the second carrier.

In a feasible implementation, the third carrier may be the first carrier or any carrier other than the second carrier.

The third carrier may also be referred to as an SRS switching indication carrier or an SRS switching configuration carrier.

In a feasible implementation, the network device may indicate the first time period or the first timing to the terminal device by using RRC signaling, PHY signaling, or MAC signaling.

Because the communications parameter of the third carrier and the communications parameter of the second carrier may be different, common duration (duration) between the third carrier and the second carrier is different. For each aligned duration, a same piece of configuration information may be involved. Therefore, the first time period or the first timing is determined by implementing the foregoing feasible implementation, to reduce a difficulty in determining the configuration information by the network device.

In an optional implementation, the SRS may be a periodic SRS or an aperiodic SRS. If the SRS is an aperiodic SRS, the network device may trigger, by using an SRS request, the terminal device to transmit the aperiodic SRS, and indicate the configuration information to the terminal device; or if the SRS is a periodic SRS, the network device may directly indicate the configuration information to the terminal device without sending an SRS request.

In a feasible implementation, the frequency band information is sent to the terminal device through the group PDCCH or by using the group DCI, and the symbol information and/or the slot information are and/or is sent to the terminal device by using at least one of the MAC signaling or the RRC signaling; or the symbol information and/or the slot information are and/or is sent to the terminal device through the group PDCCH or by using the group DCI, and the frequency band information is sent to the terminal device by using at least one of the MAC signaling or the RRC signaling; or the symbol information and/or the slot information are and/or is sent to the terminal device through the group PDCCH or by using the group DCI, and the frequency band information is sent to the terminal device through the group PDCCH or by using the group DCI.

In a feasible implementation, the network device receives, when SRS switching needs to be performed, air interface signaling sent by the terminal device, where the air interface signaling is used to indicate a beamforming capability parameter of the terminal device and/or a radio frequency capability parameter of a target beam to the network device.

In a feasible implementation, the radio frequency capability parameter is a radio frequency capability parameter corresponding to one carrier or a radio frequency capability parameter corresponding to a group of carriers, the carrier is a carrier that has a corresponding communications parameter, and the group of carriers is a group of carriers that have a common communications parameter; or the radio frequency capability parameter is a radio frequency capability parameter corresponding to one beam or a radio frequency capability parameter corresponding to a group of beams.

In a feasible implementation, the radio frequency capability parameter includes a calibration time or an adjustment time of a radio frequency on a corresponding carrier, or a calibration time or an adjustment time of a radio frequency on a corresponding beam.

In a feasible implementation, the beamforming capability parameter of the terminal device includes a quantity of simultaneously supported beams and/or a carrier aggregation capability parameter; the quantity of simultaneously supported beams is a quantity of simultaneously supported beams for any one carrier or a plurality of carriers; and the carrier aggregation capability parameter includes an uplink carrier aggregation capability parameter of simultaneously supported carriers for any one beam or a plurality of beams, or a carrier aggregation capability parameter of simultaneously supported carriers for different beamwidths.

In a feasible implementation, the quantity of simultaneously supported carriers is a quantity of carriers that have a same communications parameter, or the quantity of simultaneously supported carriers is a quantity of carriers that have respective corresponding communications parameters.

In a feasible implementation, the quantity of simultaneously supported beams is a quantity of a group of carriers that have a same communications parameter; or the quantity of simultaneously supported beams is a quantity of carriers that have respective corresponding communications parameters; or the quantity of simultaneously supported beams is a quantity for one carrier that has a corresponding communications parameter.

According to a second aspect, an embodiment of the present invention provides a signal configuration method, and the method includes: receiving, by a terminal device, configuration information that is on a second carrier and/or a second beam, that is used to transmit a sounding reference signal SRS, and that is sent by a network device, where the configuration information includes at least one of symbol information, slot information, and/or frequency band information; and switching, by the terminal device based on the configuration information, the SRS from a first carrier and/or a first beam to the second carrier and/or the second beam for transmission, where the first carrier is a carrier from which the SRS is switched, and the first beam is a beam from which the SRS is switched.

A communications parameter of the first carrier and a communications parameter of the second carrier are the same or different, and the communications parameter includes a subcarrier spacing and/or a waveform parameter.

In a feasible implementation, the configuration information is sent to the terminal device by using at least one of PHY signaling, RRC signaling, or MAC signaling, and the PHY is signaling sent through a group PDCCH or by using group DCI.

In a feasible implementation, the frequency band information is partial frequency band information or carrier information.

In a feasible implementation, the configuration information further includes a frequency band correspondence; and the frequency band correspondence is a relationship between a frequency band of the second carrier to which the SRS is switched and a frequency band corresponding to the communications parameter; and/or the frequency band correspondence is a relationship between a frequency band on the second beam to which the SRS is switched and a frequency band corresponding to a communications parameter.

In a feasible implementation, the symbol information is used to indicate symbol information in a first time period, and the first time period is a time period determined based on a communications parameter of a third carrier and the communications parameter of the second carrier; or the symbol information is used to indicate symbol information in a first timing, and the first timing is a timing determined based on the communications parameter of the second carrier; or the symbol information is used to indicate symbol information determined based on the communications parameter of the second carrier.

In a feasible implementation, the terminal device may obtain the first time period or the first timing by using RRC signaling, MAC signaling, or PHY signaling.

In a feasible implementation, the SRS is a periodic SRS or an aperiodic SRS; and the receiving, by a terminal device, configuration information that is on a second carrier and/or a second beam, that is used to transmit a sounding reference signal SRS, and that is sent by a network device includes:

if the SRS is an aperiodic SRS, receiving, by the terminal device, an SRS request that is sent by the network device and configuration information that is on the second carrier and/or the second beam, that is used to transmit the aperiodic sounding reference signal SRS, and that is sent by the network device, where the SRS request is used to trigger the terminal device to transmit the aperiodic SRS; or if the SRS is a periodic SRS, receiving, by the terminal device, configuration information that is on the second carrier and/or the second beam, that is used to transmit the aperiodic sounding reference signal SRS, and that is sent by the network device.

The second carrier may be a carrier on a low frequency band. Optionally, the second carrier may be a supplementary uplink carrier. The supplementary uplink carrier is a low-frequency carrier, is usually a carrier used for LTE communication on a low frequency band lower than 6 GHz, and is an uplink carrier used for fifth generation (5G) communication in a 5G system. The second carrier may be alternatively a carrier on a high frequency band.

Similarly, the first carrier may be a carrier on a low frequency band. Optionally, the first carrier may be a supplementary uplink carrier. The supplementary uplink carrier is a low-frequency carrier, is usually a carrier used for LTE communication on a low-frequency band lower than 6 GHz, and is an uplink carrier used for 5G communication in a 5G system. The first carrier may be alternatively a carrier on a high frequency band.

When the first carrier is a carrier on a high frequency band, the switching, by the terminal device based on the configuration information, the SRS from a first carrier and/or a first beam to the second carrier and/or the second beam for transmission includes: switching, by the terminal device based on the configuration information, the SRS from a first beam of the first carrier to the second carrier for transmission, where the second carrier may be a supplementary uplink carrier or an ordinary carrier; or switching, by the terminal device based on the configuration information, the SRS from a first beam of the first carrier to a second beam of the first carrier for transmission; or switching, by the terminal device based on the configuration information, the SRS from a first beam of the first carrier to a second beam of the second carrier for transmission.

When the first carrier is a carrier on a low frequency band, the switching, by the terminal device based on the configuration information, the SRS from a first carrier and/or a first beam to the second carrier and/or the second beam for transmission includes: switching, by the terminal device based on the configuration information, the SRS from the first carrier to the second carrier for transmission, where the second carrier may be a supplementary uplink carrier or an ordinary carrier; or switching, by the terminal device, based on the configuration information the SRS from the first carrier to a second beam of the second carrier for transmission.

In a feasible implementation, the terminal device receives the frequency band information through the group PDCCH or by using the group DCI, and receives the symbol information and/or the slot information by using at least one of the MAC signaling or the RRC signaling.

Alternatively, the terminal device receives the symbol information and/or the slot information through the group PDCCH or the group DCI, and receives the frequency band information by using the MAC signaling or the RRC signaling.

Alternatively, the terminal device receives the symbol information and/or the slot information through the group PDCCH or by using the group DCI, and receives the frequency band information through the group PDCCH or by using the group DCI.

In a feasible implementation, the terminal device may send air interface signaling to the network device when SRS switching needs to be performed, where the air interface signaling is used to indicate a beamforming capability parameter of the terminal device and/or a radio frequency capability parameter to the network device.

In a feasible implementation, the radio frequency capability parameter is a radio frequency capability parameter corresponding to one carrier on a target beam or a radio frequency capability parameter corresponding to a group of carriers on a target beam, the carrier is a carrier that has a corresponding numerology, and the group of carriers is a group of carriers that have a common numerology.

Alternatively, the radio frequency capability parameter is a radio frequency capability parameter corresponding to one beam or a radio frequency capability parameter corresponding to a group of beams.

In a feasible implementation, the radio frequency capability parameter includes a calibration time or an adjustment time of a radio frequency module of the terminal device on a corresponding carrier, or a calibration time or an adjustment time of a radio frequency module of the terminal device on a corresponding beam.

In a feasible implementation, the beamforming capability parameter of the terminal device includes a quantity of simultaneously supported beams and/or a carrier aggregation capability parameter; the quantity of simultaneously supported beams is a quantity of simultaneously supported beams for any one carrier or a plurality of carriers; and the carrier aggregation capability parameter is an uplink carrier aggregation capability parameter of simultaneously supported carriers for any one beam or a plurality of beams, or a carrier aggregation capability parameter of simultaneously supported carriers for different beamwidths.

In a feasible implementation, the simultaneously supported carriers are carriers that have a same numerology, or the simultaneously supported carriers are carriers that have respective corresponding numerologies.

In a feasible implementation, the quantity of simultaneously supported beams is a quantity of a group of carriers that have a same numerology; or the quantity of simultaneously supported beams is a quantity of carriers that have respective corresponding numerologies; or the quantity of simultaneously supported beams is a quantity for one carrier that has a corresponding numerology.

According to a third aspect, an embodiment of the present invention provides a network device. The network device may include a plurality of functional modules that are configured to correspondingly perform the method provided in the first aspect or the method provided in any one of the possible implementations of the first aspect.

According to a fourth aspect, an embodiment of the present invention provides a terminal device. The terminal device may include a plurality of functional modules that are configured to correspondingly perform the method provided in the second aspect or the method provided in any one of the possible implementations of the second aspect.

According to a fifth aspect, this application provides a network device that is configured to perform the signal configuration method described in the first aspect. The network device may include a memory and a processor, where the memory is configured to store implementation code of the signal configuration method described in the first aspect, and the processor is configured to execute program code stored in the memory, that is, perform the method provided in the first aspect or the method provided in any one of the possible implementations of the first aspect.

According to a sixth aspect, this application provides a terminal device that is configured to perform the signal configuration method described in the second aspect. The network device may include a memory and a processor, where the memory is configured to store implementation code of the signal configuration method described in the second aspect, and the processor is configured to execute program code stored in the memory, that is, perform the method provided in the second aspect or the method provided in any one of the possible implementations of the second aspect.

According to a seventh aspect, a computer-readable storage medium is provided, where the readable storage medium stores program code for implementing the signal configuration method provided in the first aspect or the second aspect or the signal configuration method provided in any one of the possible implementations of the first aspect or the second aspect, and the program code includes an execution instruction for running the signal configuration method provided in the first aspect or the second aspect, or the signal configuration method provided in any one of the possible implementations of the first aspect or the second aspect.

BRIEF DESCRIPTION OF DRAWINGS

To describe the technical solutions in the embodiments of the present invention more clearly, the following briefly describes the accompanying drawings required for describing the prior art and the embodiments. Apparently, the accompanying drawings in the following description are merely some embodiments of the present invention, and a person of ordinary skill in the art may still derive other drawings from these accompanying drawings without creative efforts.

DETAILED DESCRIPTION OF EMBODIMENTS

The following describes the technical solutions in the embodiments of the present invention with reference to the accompanying drawings in the embodiments of the present invention.

To better understand a signal configuration method and a related device provided in the embodiments of the present invention, the following first describes a system architecture involved in this application.

All of the following phrases or any variation thereof, "'x', 'y' and/or", "at least one of x and y", "x and/or y", and "at least one of x, and/or y", are to be understood to mean "x", "y" or "x" and "y", or in other words, any combination thereof.

Figure 1:
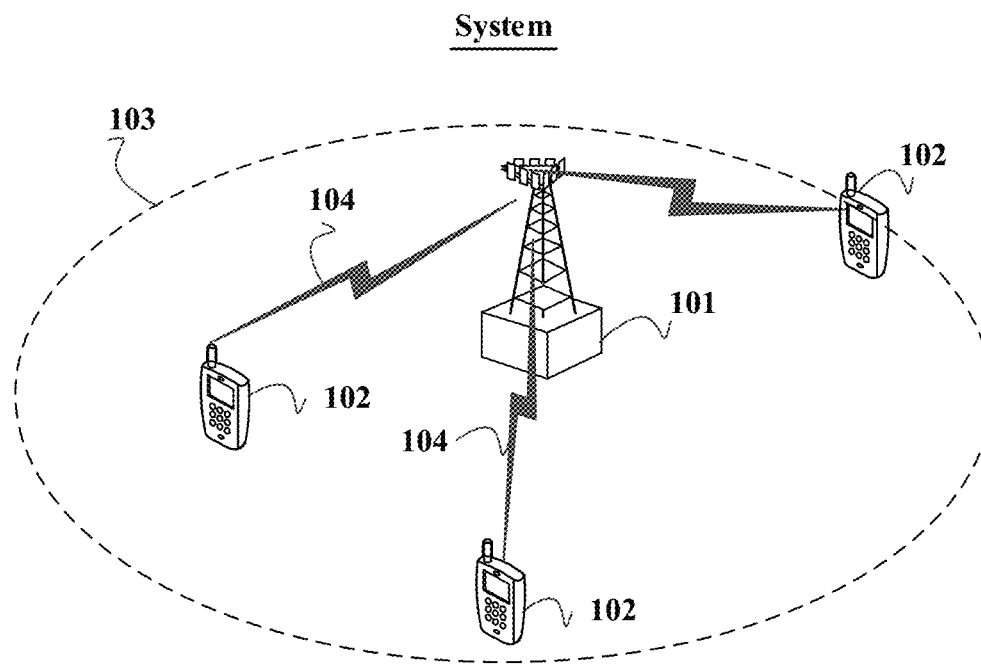
FIG. 1 is an architectural diagram of a system used for signal configuration according to an embodiment of the present invention.

FIG. 1 is an architectural diagram of a system used for signal configuration according to an embodiment of the present invention. The system may be, but not limited to, a long term evolution (LTE) mobile communications system, a future evolved 5th generation (5G) mobile communications system, a new radio (NR) system, and the like. As shown in FIG. 1, the system may include a network device 101 and one or more terminal devices 102.

The network device 101 may be a base station. The base station may be configured to communicate with one or more terminal devices, or may be configured to communicate with one or more base stations that have some terminal functions (for example, communication between a macro base station and a micro base station such as an access point). The base station may be a base transceiver station (BTS) in a time division-synchronous code division multiple access (TD-SCDMA) system, or may be an evolved Node B (Evolutional Node B, eNodeB) in an LTE system, or a base station in a 5G system or a new radio (NR) system. In addition, the base station may be alternatively an access point (AP), a transmission reception point (TRP), a central unit (CU), or another network entity, and may include some or all functions of the foregoing network entity.

Specifically, the network device 101 may include two basic functional modules: a building baseband unit (BBU) and a remote radio unit (RRU). The BBU may complete baseband processing functions (coding, multiplexing, modulation, spectrum spreading, and the like) of a Uu interface, functions such as signaling processing, local and remote operation and maintenance, and functions of working status monitoring and alarm information reporting of the network device. The RRU may be configured to perform modulation and demodulation, digital frequency up/down conversion, analog-to-digital (A/D) conversion, and the like, for optical transmission, and may be configured to complete functions of converting an intermediate frequency signal to a radio frequency signal and transmitting the radio frequency signal through an antenna port.

The terminal device 102 may be a terminal camping on a cell 103. In an embodiment, the terminal devices 102 may be distributed in the entire system. In some embodiments of this application, the terminal device 102 may be static, for example, a desktop computer or a fixed large-scale computer, or may be mobile, for example, a mobile device, a mobile station (mobile station), a mobile unit, a machine-to-machine (M2M) terminal, a radio unit, a remote unit, a user agent, a mobile client, or the like.

In an embodiment, the network device 101 may be configured to communicate with the terminal device 102 through a radio interface 104.

Figure 2:
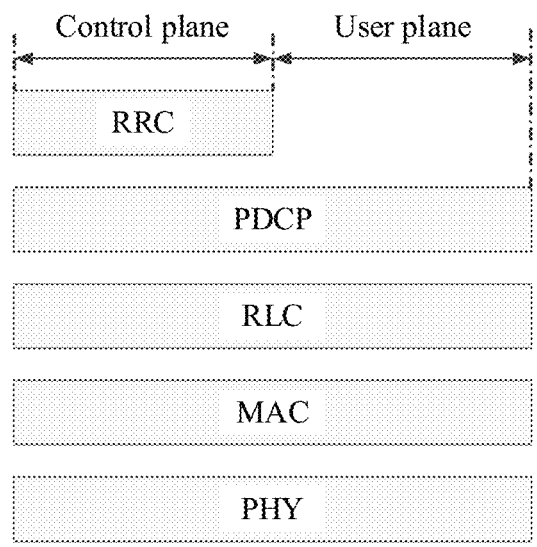
FIG. 2 is a schematic scenario diagram of a radio interface protocol layer according to an embodiment of the present invention.

FIG. 2 is a schematic scenario diagram of a radio interface protocol layer according to an embodiment of the present invention. An interface between the radio interface protocol layers shown in FIG. 2 may be expressed as a channel, and may specifically include a logical channel, a transport channel, and a physical channel.

(1) A physical layer (PHY) transmits a specific signal through the physical channel. The physical channel corresponds to a set of resource elements (REs) that carry higher layer information. Base entities that constitute the physical channel are a resource element (RE) and a resource block (RB).

In an embodiment, the physical channel may include a PDCCH (physical downlink control channel), a PDSCH (physical downlink shared channel), a PBCH (physical broadcast channel), a PMCH (physical multicast channel), a PHICH (physical Hybrid-ARQ indicator channel), a PUSCH (physical uplink shared channel), a PRACH (physical random access channel), or the like. This is not limited in the embodiments of the present invention.

(2) An interface between the PHY layer and a media access control (MAC) layer is a transport channel, and the PHY layer provides a service for the MAC layer through the transport channel.

In an embodiment, the transport channel may include a DL-SCH (downlink shared channel), a BCH (broadcast channel), an MCH (multicast channel), a PCH (paging channel), an UL-SCH (uplink shared channel), a RACH (random access channel), or the like. This is not limited in the embodiments of the present invention.

(3) An interface between the media access control (MAC) layer and a radio link control (RLC) layer is a logical channel, and the MAC layer may provide a service for the RLC layer through the logical channel.

In an embodiment, the logical channel may include: an implementation (paging control channel), paging control (common control channel), a DCCH (dedicated control channel), a DTCH (dedicated traffic channel), or the like. This is not limited in the embodiments of the present invention.

In an embodiment, the radio resource control (Radio Resource Control, RRC) layer may allocate a radio resource and send related signaling (for example, RRC signaling). A main part for controlling signaling between a terminal device and a network device is an RRC message. The RRC message carries all parameters required for establishing, modifying, and releasing a MAC layer protocol entity and a PHY layer protocol entity, and may further carry some signaling of a non-access stratum (NAS).

It should be noted that the system shown in FIG. 1 is intended to more clearly describe the technical solutions in this application, and constitutes no limitation on this application. A person of ordinary skill in the art may learn that as a network architecture evolves and a new service scenario emerges, the technical solutions provided in this application are also applicable to resolving a similar technical problem.

The following describes related carrier/beam switching configuration for an SRS with reference to the foregoing descriptions of the system architecture.

A sounding reference signal SRS can be used to measure uplink channel quality in different frequency bands, and is an important signal in a communications system. For a carrier or a beam that can be used for both uplink transmission and downlink transmission, a base station may estimate uplink channel quality in different frequency bands by using an SRS, and estimate channel fading that a sent downlink signal is to go through with reference to channel reciprocity (when an interval of an uplink sending time and a downlink sending time is short enough, it may be considered that fading of an uplink channel is basically the same as fading of a downlink channel), to determine downlink channel quality.

In an embodiment, if the system shown in FIG. 1 is an LTE system, in the LTE system, a terminal device can usually aggregate a larger quantity of downlink carriers compared with that in uplink transmission. Consequently, some TDD carriers are used for uplink transmission but are not used for downlink transmission. Therefore, there is no SRS to be sent. For these carriers, channel reciprocity cannot be efficiently utilized, especially when a capability of carrier aggregation (CA) is boosted to 32 component carriers (CCs) and most of the component carriers are TDD carriers, the problem becomes worse.

Allowing fast carrier switching is an effective method, and when it is determined that a current TDD carrier is not used for uplink transmission, an SRS is switched to another TDD carrier that is used for uplink transmission. This can ensure that the SRS can be transmitted on these TDD carriers.

In the LTE system, SRSs can be classified into a periodic SRS and an aperiodic SRS. In switching transmission of the periodic SRS, related configuration information of the SRS can be configured based on an LTE R8-R13 protocol. Switching of the aperiodic SRS can be triggered based on a requirement received in a subframe (subframe) n, and the aperiodic SRS is transmitted in a subframe n+k. In the LTE system, a carrier from which the SRS is switched and a carrier to which the SRS is switched can have a same frame structure, k is counted at a subframe level, and k is affected by a processing delay, an uplink subframe, and another hybrid automatic repeat request (HARD) mechanism.

In an embodiment, if the system shown in FIG. 1 is a 5G system or a future new radio (NR) system, different numerologies may be applicable to different carriers, or a same numerology may be applicable to different carriers. This affects a subframe/slot structure, and also affects related configuration of SRS switching.

Figure 3:
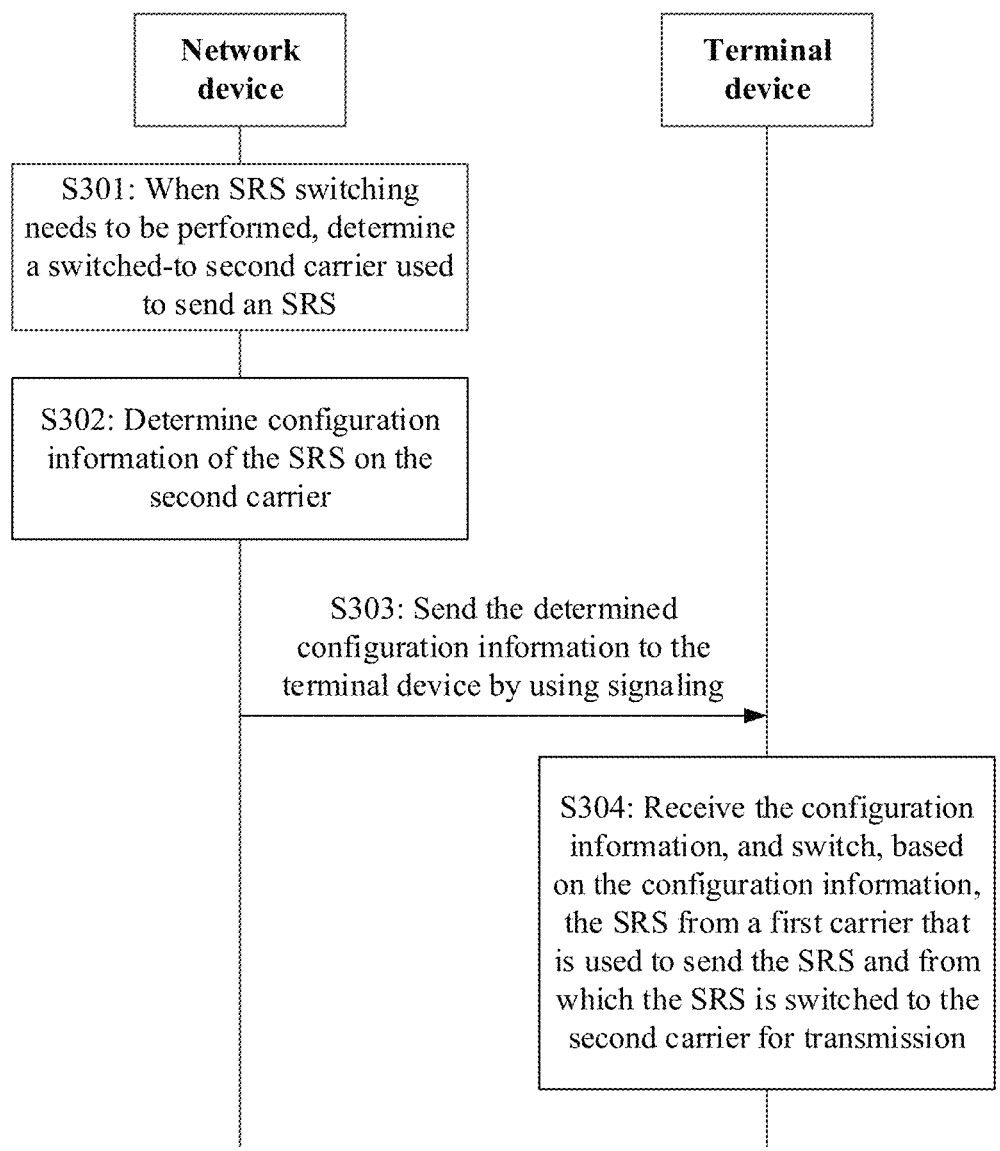
FIG. 3 shows a related configuration policy for SRS carrier switching according to an embodiment of the present invention.
Figure 4:
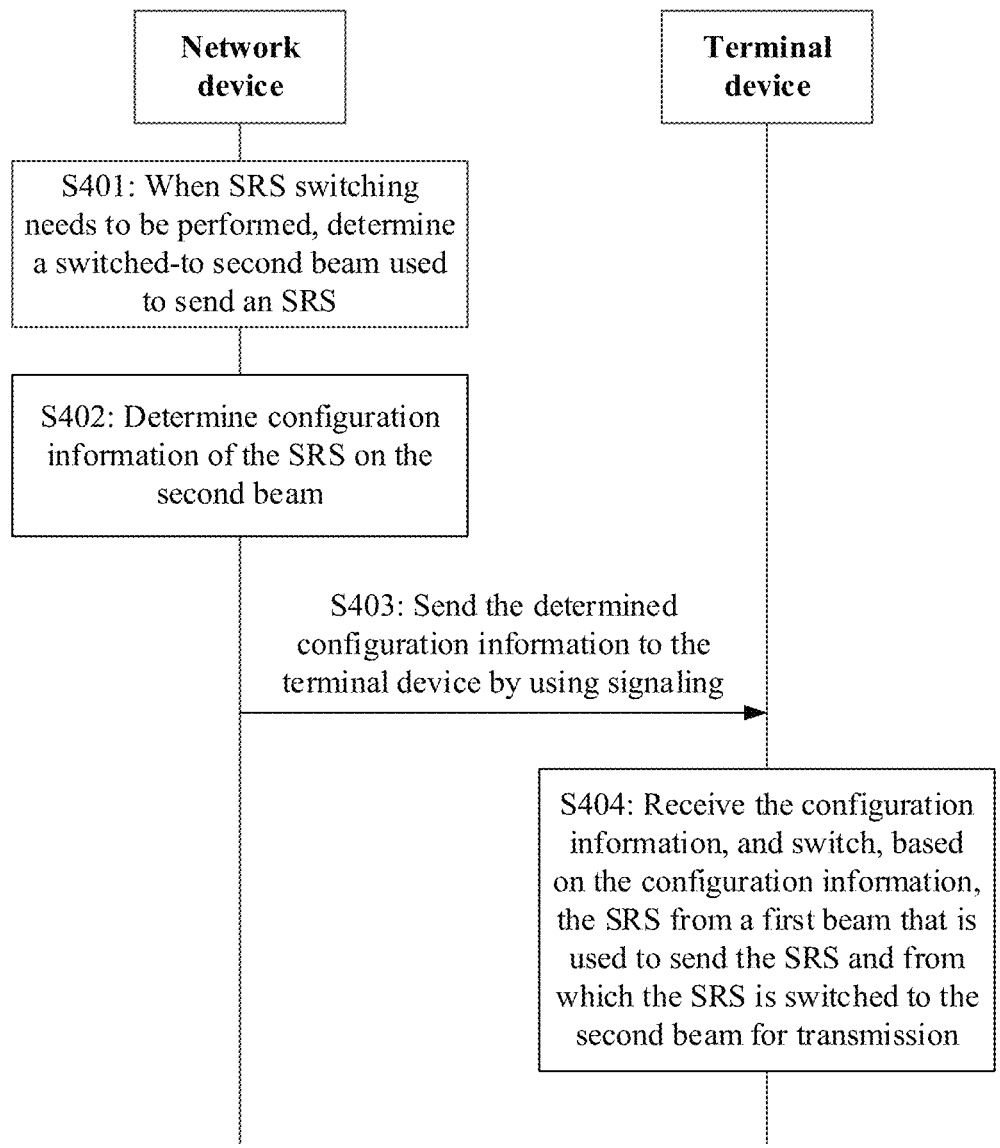
FIG. 4 shows a related configuration policy for SRS beam switching according to an embodiment of the present invention.

In this application, for a carrier or a beam supported by the 5G and future new radio (NR), related configuration of SRS switching may include policies that are shown in FIG. 3 and FIG. 4.

The 5G and the future new radio (NR) may support SRS carrier switching, or may support SRS beam switching. A carrier may be a physical concept in frequency domain, and a beam may be a physical concept in space. In an embodiment, the beam may be a beam that points to different directions and that has a specific spatial transmission gain. There may be a plurality of carriers on one beam. Similarly, there may be alternatively a plurality of beams in different directions on one carrier. The SRS carrier switching may include the policy shown in FIG. 3, and the SRS beam switching may include the policy shown in FIG. 4.

FIG. 3 shows a related configuration policy for SRS carrier switching according to an embodiment of the present invention. In S301, when SRS switching needs to be performed, a network device may determine a switched-to second carrier used to send an SRS.

The second carrier is a switched-to carrier used to send an SRS, and a first carrier is a carrier that is used to send the SRS and from which the SRS is switched. In an embodiment, "after switching" may be replaced with "after transfer", "transfer to", "switching to", or the like, and "before switching" may be replaced with "before transfer". This is not limited in the embodiments of the present invention.

In S302, the network device may determine configuration information of the SRS on the second carrier.

In an embodiment, the network device determines configuration information that is on the second carrier and that is used to transmit the sounding reference signal SRS. The configuration information of the SRS includes configuration information in time domain and/or configuration information in frequency domain. The configuration information in time domain may include one of or a combination of symbol information, slot information, or subframe information. The configuration information in frequency domain may include frequency band information, and the frequency band information may be partial frequency band information or carrier information.

A numerology of the first carrier and a numerology of the second carrier are the same or different, and the numerology includes at least a subcarrier spacing and/or a waveform parameter.

The second carrier may be a carrier on a low frequency band. Optionally, the second carrier may be a supplementary uplink carrier. The supplementary uplink carrier is a low-frequency carrier, is usually a carrier used for LTE communication on a low frequency band lower than 6 GHz, and is an uplink carrier used for 5G communication in a 5G system. The second carrier may be alternatively a carrier on a high frequency band.

Similarly, the first carrier may be a carrier on a low frequency band. Optionally, the first carrier may be a supplementary uplink carrier. The supplementary uplink carrier is a low-frequency carrier, is usually a carrier used for LTE communication on a low frequency band lower than 6 GHz, and is an uplink carrier used for 5G communication in a 5G system. The first carrier may be alternatively a carrier on a high frequency band.

In an embodiment, the network device may determine the configuration information of the SRS in time domain based on a timing of the second carrier or the numerology of the second carrier.

The timing may be a timing of a first time period, and the timing may include an indication of one or more pieces of slot information on the second carrier, an indication of one or more pieces of OFDM (orthogonal frequency division multiplexing) symbol information, or a joint indication of slot information and OFDM symbol information. The indication of the slot information may include, for example, a start slot (start slot) location, and the indication of the OFDM symbol information may include, for example, a start OFDM symbol (start OFDM) location.

When the slot information is indicated, an OFDM symbol or an OFDM symbol pattern (OFDM pattern) may be pre-configured. When the OFDM symbol information is indicated, a slot or a slot pattern may be pre-configured.

In an embodiment, the timing may further include duration (duration), and the duration may be determined based on a slot or an OFDM symbol. The timing may be used to indicate information within aligned duration or an aligned time length. Alignment may mean that the numerology of the first carrier and the numerology of the second carrier are aligned.

The aligned time length may be a common slot length (slot length) or common OFDM symbol duration of the first carrier and the second carrier.

In an embodiment, the first time period may be obtained by comparing a numerology of a third carrier with the numerology of the second carrier. The third carrier may be the first carrier, or may be a carrier (for example, a primary carrier component (PCC) or a specific carrier) other than the second carrier. The third carrier may also be referred to as a switching indication carrier or an SRS switching configuration carrier. The time period may be at least one type or a combination of more than one type of a plurality of OFDM symbols, a plurality of slots, a plurality of mini-slots, a plurality of subframes, or a plurality of mini-subframes.

In an embodiment, the network device may indicate the first time period to the terminal device by using RRC signaling or PHY signaling.

In an embodiment, that the network device determines the configuration information of the SRS in time domain based on the numerology of the second carrier may include: the configuration information of the SRS in time domain includes symbol information on the second carrier, and the symbol information on the second carrier is determined based on the numerology of the second carrier.

In an embodiment, the symbol information on the second carrier may be used to indicate symbol information in a preset first time period. For example, the symbol information on the second carrier may include a start OFDM location, duration, and the like in the first time period.

Alternatively, the symbol information on the second carrier may be used to indicate symbol information in a first timing, and the first timing is a timing determined based on a communications parameter of the second carrier. The time may be at least one or a combination of more than one of a slot, a mini-slot, a subframe, or a mini-subframe.

Alternatively, the symbol information on the second carrier may be used to indicate symbol information determined based on a communications parameter of the second carrier.

In an embodiment, the network device may indicate the first timing to the terminal device by using RRC signaling, MAC signaling, or PHY signaling.

In an embodiment, the slot information on the second carrier may be used to indicate slot information in a preset first time period. For example, the slot information on the second carrier may include a start slot location, duration, and the like in the first time period.

In an embodiment, the frequency band information on the second carrier may be partial frequency band information or carrier information. The partial frequency band information may be partial frequency band information on the second carrier, and the carrier information may be all frequency band information on the second carrier. The frequency band information may be a transmission bandwidth.

In an embodiment, the network device may determine a transmission bandwidth of the SRS on the second carrier based on the numerology of the first carrier and the numerology of the second carrier, and use the transmission bandwidth as a part of the configuration information.

In an embodiment, the configuration information may further include a frequency band correspondence, and the frequency band correspondence may be a relationship between a frequency band of the second carrier to which the SRS is switched and a frequency band corresponding to the numerology.

Because different numerologies may be used for different transmission bandwidths, the transmission bandwidths may be implicitly associated with different numerologies to reduce configuration costs. Specifically, a correspondence (namely, the frequency band correspondence) between the transmission bandwidth of the SRS and the numerology may be pre-established, and then the frequency band correspondence is used as a part of the configuration information. When the configuration information is sent to the terminal device by using signaling, the terminal device may determine, based on the frequency band correspondence in the configuration information and the numerology of the second carrier, a transmission bandwidth required for transferring the SRS to the second carrier.

For example, a value of the transmission bandwidth of the SRS is equal to a value of the numerology, or a value of the transmission bandwidth of the SRS is not equal to a value of the numerology.

In an embodiment, the configuration information may be indicated on the third carrier.

It should be noted that, to meet different transmission requirements, a system configures different communications parameters (numerology) for different carriers or beams simultaneously, to support different service scenarios. The numerology represents an attribute of a time-frequency resource, and includes a group of parameters, for example, a time domain symbol length, a time domain scheduling interval, a subcarrier spacing (SCS), a CP length (Nominal CP), and a waveform parameter. Different carriers may include different numerologies. Therefore, when SRS carrier switching is performed, the timing of the second carrier may be indicated on the third carrier, and the timing of the second carrier may be obtained with reference to the numerology of the second carrier.

S303: The network device sends the determined configuration information to the terminal device by using signaling.

In an embodiment, the network device may deliver the configuration information to the terminal device by using signaling. The signaling may be at least one of the RRC signaling, the MAC signaling, or the PHY signaling.

The PHY signaling may be signaling sent through a group PDCCH or by using group DCI. The group PDCCH carries the group downlink control information. The group physical downlink control channel may also be referred to as a group common physical downlink control channel (group common PDCCH). The group downlink control information may also be referred to as group common downlink control information (group common DCI).

The group PDCCH may be located in group common search space (GCSS.

In an embodiment, the SRS includes a periodic SRS or an aperiodic SRS.

In an embodiment, when SRS switching is performed and an aperiodic indication is transmitted, the network device may trigger, by using an SRS request (SRS request), the terminal device to transmit the aperiodic SRS, and indicate the configuration information to the terminal device.

A manner of indicating the configuration information to the terminal device may be carrying the configuration information in the SRS request, or sending the determined configuration information to the terminal device by using any one piece or a plurality of pieces of the foregoing signaling.

In an embodiment, when SRS switching is performed and a periodic indication is transmitted, the network device may not send an SRS request, but indicate the configuration information to the terminal device. For example, the determined configuration information is sent to the terminal device by using any one piece or a plurality of pieces of the foregoing signaling.

Correspondingly, a manner of receiving, by the terminal device, configuration information that is on the second carrier and/or a second beam, that is used to transmit a sounding reference signal SRS, and that is sent by the network device may be: if the SRS is an aperiodic SRS, receiving, by the terminal device, an SRS request that is sent by the network device and configuration information that is on the second carrier and/or the second beam, that is used to transmit the aperiodic sounding reference signal SRS, and that is sent by the network device, where the SRS request is used to trigger the terminal device to transmit the aperiodic SRS.

If the SRS is a periodic SRS, the terminal device receives configuration information that is on the second carrier and/or the second beam, that is used to transmit the aperiodic sounding reference signal SRS, and that is sent by the network device.

In an embodiment, a period and a start timing of the SRS may be re-explained by using the numerology on the second carrier.

In an embodiment, the frequency band information is sent to the terminal device through the group PDCCH or by using the group DCI, and the symbol information and/or the slot information are and/or is sent to the terminal device by using at least one of the MAC signaling or the RRC signaling.

Alternatively, the symbol information and/or the slot information are and/or is sent to the terminal device through the group PDCCH or by using the group DCI, and the frequency band information is sent to the terminal device by using at least one of the MAC signaling or the RRC signaling.

Alternatively, the symbol information and/or the slot information are and/or is sent to the terminal device through the group PDCCH or by using the group DCI, and the frequency band information is sent to the terminal device through the group PDCCH or by using the group DCI.

S304: The terminal device receives the configuration information that is on the second carrier, that is used to transmit the SRS, and that is sent by the network device, and switches, based on the configuration information, the SRS from the first carrier that is used to send the SRS and from which the SRS is switched to the second carrier for transmission.

For example, the configuration information includes a symbol location and/or a transmission bandwidth for SRS transmission on the second beam. The terminal device switches, based on the transmission symbol location, the SRS from the first carrier to a corresponding transmission symbol location on the second carrier for transmission, and configures a corresponding transmission bandwidth for the SRS on the second carrier based on the transmission bandwidth.

Figure 5:
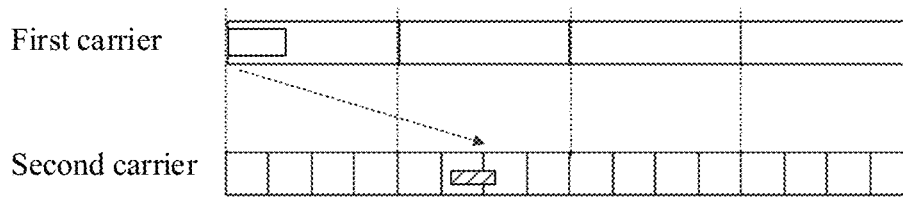
FIG. 5 is a schematic scenario diagram of SRS carrier switching according to an embodiment of the present invention.
Figure 5:
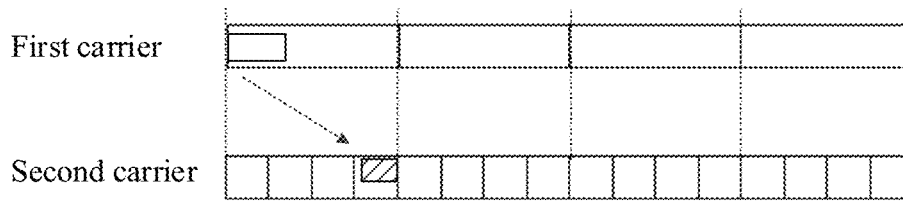

FIG. 5 is a schematic scenario diagram of SRS carrier switching according to an embodiment of the present invention. FIG. 5 shows a scenario in which SRS carrier switching is performed when a first carrier has a relatively small subcarrier spacing (for example, 15 kHz) and a second carrier has a relatively large subcarrier spacing (for example, 60 kHz).

Specifically, when the second carrier and the first carrier have different subcarrier spacings, because the second carrier and the first carrier have different slot lengths, a slot length on the first carrier corresponds to transmission of a plurality of slots on the switched-to second carrier. For example, there are four slots.

Therefore, a timing may include a start slot or an OFDM symbol and duration duration, where the duration is obtained based on a slot number or an OFDM number, the timing may be common aligned duration or a common aligned time length of the second carrier and the first carrier. So-called alignment means that the numerology of the second carrier and the numerology of the first carrier are aligned.

The aligned time length is a common slot length of the first carrier and the second carrier.

In FIG. 5, because 60 kHz/15 kHz=4, there are four slots on the second carrier in one configuration. Therefore, the configuration is notified according to a slot pattern that includes the four slots. The network device may first determine configuration information of an SRS, and indicate the configuration information at a slot location of a first aligned time length on the first carrier (in another embodiment, the first carrier may alternatively be replaced with any carrier other than the second carrier, namely, a third carrier). The configuration information is sent by using signaling.

Optionally, in addition to indicating the configuration information on the first carrier, the configuration information may be indicated in a preset area on the second carrier. The preset area may be a partial BWP (bandwidth part) or partial search space.

The terminal device may detect the first carrier, and receive the configuration information on the first carrier at the slot location of the first aligned time length on the first carrier. If a slot location at which the SRS is transmitted on the second carrier and that is indicated in the configuration information is located in a second aligned time length, signaling including the configuration information of the SRS on the first carrier may be located at any slot location of the first aligned time length. In this way, the terminal device can immediately detect the configuration information, and switch the SRS from the first carrier to a corresponding slot location in the second aligned time length on the second carrier for transmission.

If a slot location at which the SRS is transmitted on the second carrier and that is indicated in the configuration information is located in a second slot, a third slot, or a fourth slot of the first aligned time length, signaling including the configuration information of the SRS on the first carrier may be located at a first slot location of the first aligned time length. In this way, the terminal device can immediately detect the configuration information, and switch the SRS from the first carrier to a corresponding slot location in the first aligned time length on the second carrier for transmission.

Figure 6:
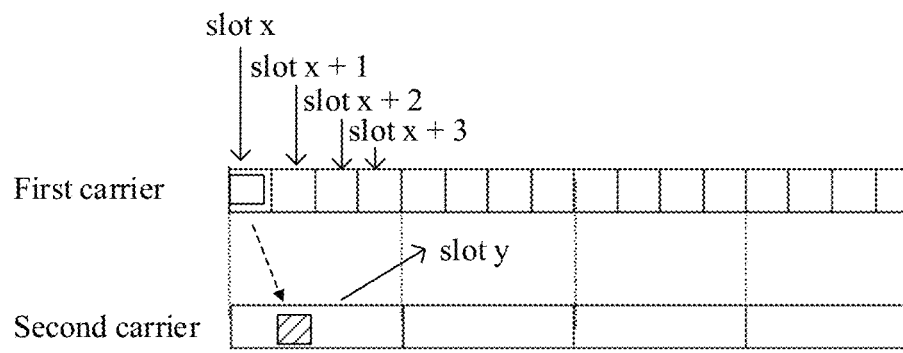
FIG. 6 is another schematic scenario diagram of SRS carrier switching according to an embodiment of the present invention.
Figure 6:
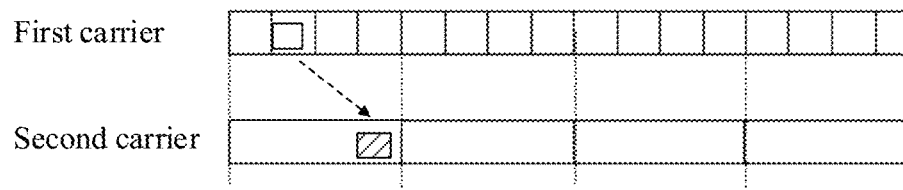

FIG. 6 is another schematic scenario diagram of SRS carrier switching according to an embodiment of the present invention. FIG. 6 shows a schematic scenario in which SRS carrier switching is performed when a first carrier has a relatively large subcarrier spacing (for example, 60 kHz) and a second carrier has a relatively small subcarrier spacing (for example, 15 kHz).

Specifically, because the first carrier and the second carrier have different slot lengths, an indication about configuration information of an SRS on the first carrier needs to be located in a first aligned time length, so that the terminal device does not miss any SRS switching transmission during detection. In other words, slots x, x+1, x+2, and x+3 on the first carrier are aligned with a slot y on the second carrier, signaling including the configuration information of the first carrier should be located at the slot x instead of the slots x+1, . . . , and x+3. In this way, the terminal device detects, in a timely manner, the configuration information for SRS switching and transmission.

In an embodiment, the signaling including the configuration information of the first carrier may be located at the slot x or the slot x+1 instead of the slot x+2, the slot x+3, or the like, unless transmission occurs in only the slot y after SRS switching and transmission time is located after the slot x+1. In this way, the terminal device can detect, in a timely manner, the configuration information for SRS switching and transmission. In this case, the network device may indicate transmission located in the slot y on the second carrier by determining a location of the signaling on the first carrier.

The foregoing configuration process may affect a detection behavior of the terminal device. Whether the terminal device performs detection and when to detect may be determined by comparing the numerology of the first carrier and the numerology of the second carrier. Therefore, the terminal may have different detection overheads.

In an embodiment, when the first carrier is a carrier on a high frequency band, that the terminal device switches, based on the configuration information, the SRS from the first carrier that is used to send the SRS and from which the SRS is switched to the second carrier for transmission includes: the terminal device switches, based on the configuration information, the SRS from a first beam of the first carrier to the second carrier for transmission, where the second carrier may be a supplementary uplink carrier or an ordinary carrier; or the terminal device switches, based on the configuration information, the SRS from a first beam of the first carrier to a second beam of the first carrier for transmission; or the terminal device switches, based on the configuration information, the SRS from a first beam of the first carrier to a second beam of the second carrier for transmission.

When the first carrier is a carrier on a low frequency band, the terminal device switches, based on the configuration information, the SRS from the first carrier that is used to send the SRS and from which the SRS is switched to the second carrier for transmission includes: the terminal device switches, based on the configuration information, the SRS from the first carrier to the second carrier for transmission, where the second carrier may be a supplementary uplink carrier or an ordinary carrier; or the terminal device switches, based on the configuration information, the SRS from the first carrier to a second beam of the second carrier for transmission.

In an embodiment, in one switching subframe, it may be considered that transmission of a plurality of SRSs is located in a same subframe on different carriers. Therefore, a location at which an SRS is located may be advanced in one subframe to improve flexibility. When a plurality of uplink sounding (UL Sounding) signals of the terminal device are transmitted and maximum load of one ODFM symbol is exceeded, a plurality of OFDM symbols may be activated to reduce uplink-downlink switching overheads from a guard period. The plurality of OFDM symbols may be OFDM symbols that are consecutively transmitted. Further, the configuration information of the SRS may include one or more subframe configurations occupied by the SRS, comb transmission, an antenna port, a cyclic shift, and a used power control parameter. Another symbol format may alternatively be used, such as a preamble or a common CDMA sequence code. This is not limited to an SRS symbol.

It can be learned that in this embodiment of the present invention, when SRS transfer needs to be performed, the network device may determine the configuration information of the SRS on the second carrier, and then send the configuration information to the terminal device by using signaling. The terminal device receives the configuration information, and switches, based on the configuration information, the SRS from the first carrier to the second carrier for transmission. Different carriers have different SRS configuration information. Therefore, the network device indicates the configuration information, so that the terminal device can switch, based on the configuration information, the SRS from the first carrier to the second carrier for transmission. In this way, correct SRS configuration is ensured when the terminal device performs SRS switching.

Optionally, in this application, the first carrier may be replaced with a first BWP, and the second carrier may be replaced with a second BWP. The first BWP and the second BWP may be located on a same carrier or different carriers, or the first BWP and the second BWP may be located on a same beam or different beams. The different carriers may be on a same beam or different beams. A same carrier or different carriers may be on a same beam, or a same carrier or different carriers may be on different beams.

FIG. 4 shows a related configuration policy for SRS beam switching according to an embodiment of the present invention.

In S401, when SRS beam switching needs to be performed, a network device may determine a switched-to second beam used to send an SRS.

The second beam is a switched-to beam used to send an SRS, and a first beam is a beam used to send the SRS and from which the SRS is switched. In an embodiment, "after switching" may be replaced with "after transfer", "transfer to", "switching to", or the like, and "before switching" may be replaced with "before transfer". This is not limited in the embodiments of the present invention.

In S402, the network device may determine configuration information of the SRS on the second beam.

In an embodiment, the network device determines configuration information that is on the second beam and that is used to transmit the SRS. The configuration information of the SRS includes configuration information in time domain and/or configuration information in frequency domain. The configuration information in time domain may include symbol information and slot information. The configuration information in frequency domain may include frequency band information, and the frequency band information may be partial frequency band information or beam information.

In an embodiment, the configuration information determined by the network device may include slot information and frequency band information, or may include slot information, symbol information, and frequency band information, or may include slot information and symbol information. That is, the configuration information may include any one piece or a plurality of pieces of slot information, frequency band information, and symbol information. This is not limited in the embodiments of the present invention.

A numerology of the first beam and a numerology of the second beam are the same or different, and the numerology includes at least a subcarrier spacing and/or a waveform parameter.

In an embodiment, the network device may determine the configuration information of the SRS in time domain based on a timing (timing) requirement of the second beam.

The timing may be a timing of a first time period, and the timing may include an indication of one or more pieces of slot information on the second beam, an indication of one or more pieces of OFDM symbol information, or a joint indication of slot information and OFDM symbol information. The indication of the slot information may include, for example, a start slot (start slot) location, and the indication of the OFDM symbol information may include, for example, a start OFDM symbol (start OFDM) location.

When the slot information is indicated, an OFDM symbol or an OFDM symbol pattern (OFDM pattern) may be pre-configured. When the OFDM symbol information is indicated, a slot or a slot pattern may be pre-configured.

In an embodiment, the timing may further include duration, and the duration may be determined based on a slot or an OFDM symbol. The timing may be used to indicate information within aligned duration or an aligned time length. Alignment may mean that the numerology of the first beam and the numerology of the second beam are aligned.

The aligned time length may be a common slot length of the first beam and the second beam.

In an embodiment, the first time period may be obtained by comparing a numerology of a third beam with the numerology of the second beam, where the third beam may be the first beam, or may be a beam (for example, a main beam (primary carrier component, PCC) or a specific beam) other than the second beam. The third beam may also be referred to as a switching indication beam or an SRS switching configuration beam.

In an embodiment, the symbol information on the second beam may be used to indicate symbol information in a preset first time period. For example, the symbol information on the second beam may include a start OFDM location, duration, and the like in the first time period.

In an embodiment, the network device may indicate the first time period to the terminal device by using RRC signaling, MAC signaling, or PHY signaling.

In an embodiment, the slot information on the second beam may be used to indicate slot information in a preset first time period. For example, the slot information on the second beam may include a start slot location, duration, and the like in the first time period.

In an embodiment, the frequency band information on the second beam may be partial frequency band information or beam information. The partial beam information may be partial frequency band information on the second beam, and the beam information may be all frequency band information on the second beam. The frequency band information may be a transmission bandwidth.

In an embodiment, the network device may determine a transmission bandwidth of the SRS on the second beam based on the numerology of the first beam and the numerology of the second beam, and use the transmission bandwidth as a part of the configuration information.

In an embodiment, the configuration information may further include a frequency band correspondence, and the frequency band correspondence may be a relationship between a frequency band of the second beam to which the SRS is switched and a frequency band corresponding to a numerology.

Specifically, a correspondence (namely, the frequency band correspondence) between the transmission bandwidth of the SRS and a numerology of a beam may be pre-established, and then the frequency band correspondence is used as a part of the configuration information. When the configuration information is sent to the terminal device by using signaling, the terminal device may determine, based on the frequency band correspondence in the configuration information and the numerology of the second beam, a transmission bandwidth required for transferring the SRS to the second beam.

For example, a value of the transmission bandwidth of the SRS is equal to a value of the numerology, or a value of the transmission bandwidth of the SRS is not equal to a value of the numerology.

In an embodiment, the configuration information may be indicated on the third beam.

It should be noted that, to meet different transmission requirements, a system configures different communications parameters (numerology) for different beams or beams simultaneously, to support different service scenarios. The numerology represents an attribute of a time-frequency resource, and includes a group of parameters, for example, a time domain scheduling interval, a subcarrier spacing (SCS), a CP length (Nominal CP), and a waveform parameter. Different beams may include different numerologies. Therefore, when SRS beam switching is performed, the timing of the second beam may be indicated on the third beam, and the timing of the second beam may be obtained with reference to the numerology of the second beam.

S403: The network device sends the determined configuration information to the terminal device by using signaling.

In an embodiment, the network device may deliver the configuration information to the terminal device by using signaling. The signaling may be at least one of RRC signaling, MAC signaling, or PHY signaling. The PHY signaling may be signaling sent through a group PDCCH or by using group DCI.

In an embodiment, the SRS includes a periodic SRS or an aperiodic SRS.

In an embodiment, when SRS switching is performed and an aperiodic indication is transmitted, the network device may trigger, by using an SRS request, the terminal device to transmit the aperiodic SRS, and indicate the configuration information to the terminal device.

A manner of indicating the configuration information to the terminal device may be carrying the configuration information in the SRS request, or sending the determined configuration information to the terminal device by using any one piece or a plurality of pieces of the foregoing signaling.

In an embodiment, when SRS switching is performed and a periodic indication is transmitted, the network device may not send an SRS request, but indicate the configuration information to the terminal device. For example, the determined configuration information is sent to the terminal device by using any one piece or a plurality of pieces of the foregoing signaling.

In an embodiment, a period and a start timing of the SRS may be re-explained by using the numerology on the second beam.

In an embodiment, the frequency band information is sent to the terminal device through the group PDCCH, and the symbol information and/or the slot information are and/or is sent to the terminal device by using at least one of the MAC signaling or the RRC signaling.

Alternatively, the symbol information and/or the slot information are and/or is sent to the terminal device through the group PDCCH, and the frequency band information is sent to the terminal device by using at least one of the MAC signaling or the RRC signaling.

Alternatively, the symbol information and/or the slot information are and/or is sent to the terminal device through the group PDCCH, and the frequency band information is sent to the terminal device through the group PDCCH.

S404: The terminal device receives the configuration information that is on the second beam, that is used to transmit the SRS, and that is sent by the network device, and switches, based on the configuration information, the SRS from the first beam that is used to send the SRS and from which the SRS is switched to the second beam for transmission.

For example, the configuration information includes a symbol location and/or a transmission bandwidth for SRS transmission on the second beam. The terminal device switches, based on the transmission symbol location, the SRS from the first beam to a corresponding transmission symbol location on the second beam for transmission, and configures a corresponding transmission bandwidth for the SRS on the second beam based on the transmission bandwidth.

In some feasible implementations, the network device and the terminal device control SRS beam switching. Refer to the embodiments corresponding to FIG. 5 and FIG. 6. Correspondingly, the "first carrier" is replaced with the "first beam", the "second carrier" is replaced with the "second beam", and the "third carrier" is replaced with the "third beam". Details are not described herein.

It can be learned that in this embodiment of the present invention, when SRS transfer needs to be performed, the network device may determine the configuration information of the SRS on the second beam, and then send the configuration information to the terminal device by using signaling. The terminal device receives the configuration information, and switches, based on the configuration information, the SRS from the first beam to the second beam for transmission. Different beams have different SRS configuration information. Therefore, the network device indicates the configuration information, so that the terminal device can switch, based on the configuration information, the SRS from the first beam to the second beam for transmission. In this way, correct SRS configuration is ensured when the terminal device performs SRS switching.

Figure 7:
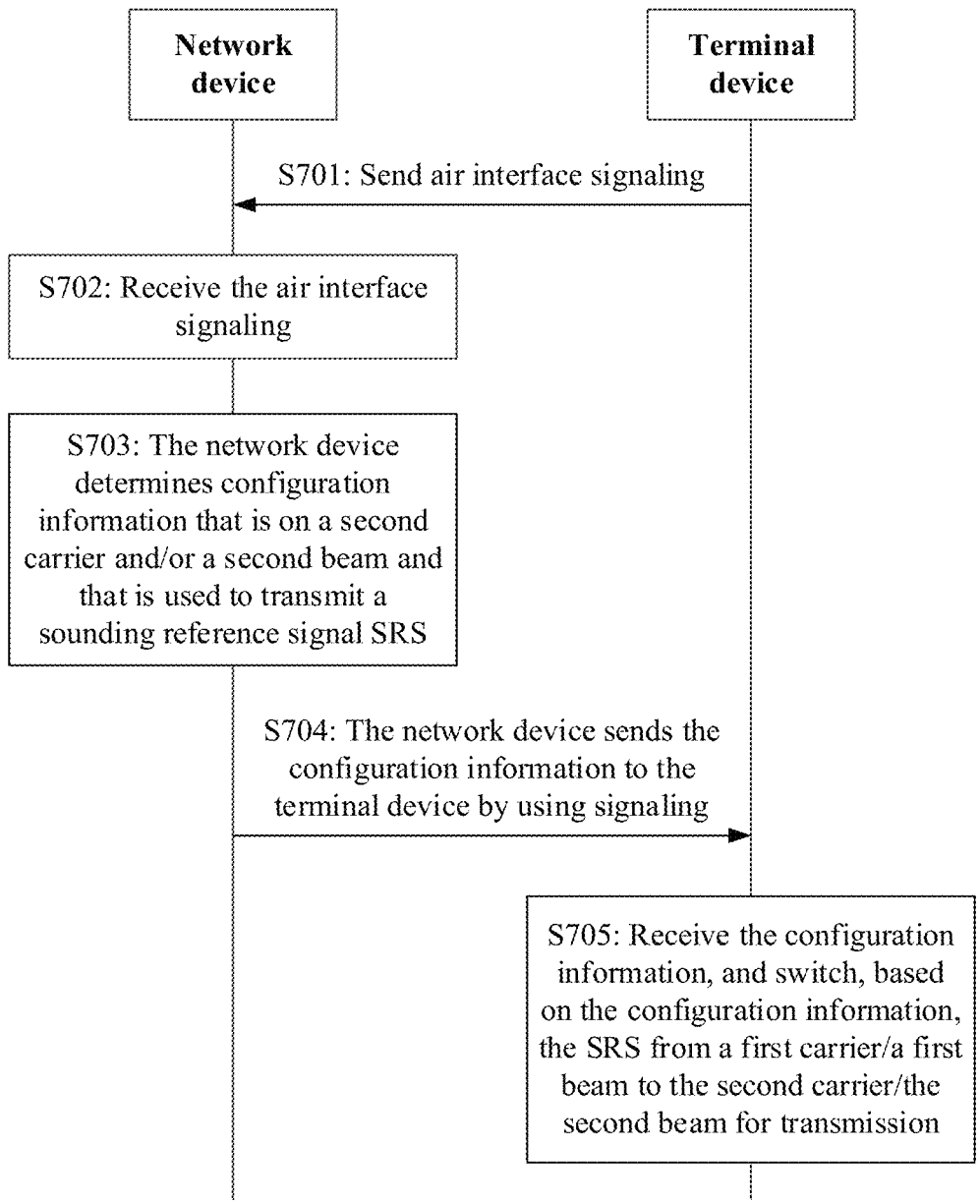
FIG. 7 is a schematic flowchart of a signal configuration method according to an embodiment of the present invention.

FIG. 7 is a schematic flowchart of a signal configuration method according to an embodiment of the present invention. The method shown in FIG. 7 may include the following steps.

S701: A terminal device sends air interface signaling to a network device.

The terminal device may send the air interface signaling to the network device when SRS switching needs to be performed, where the air interface signaling is used to indicate a beamforming capability parameter of the terminal device and/or a radio frequency capability parameter to the network device.

In an embodiment, the air interface signaling includes at least RRC signaling. This is not limited in the embodiments of the present invention.

The air interface signaling is used to indicate the beamforming capability parameter of the terminal device and/or the radio frequency capability parameter to the network device.

It should be noted that involved different beams affect SRS switching configuration. Therefore, the terminal device may report the beamforming capability parameter of the terminal device and/or the radio frequency capability parameter.

In an embodiment, the radio frequency capability parameter is a radio frequency capability parameter corresponding to one carrier on a target beam or a radio frequency capability parameter corresponding to a group of carriers on a target beam.

Alternatively, the radio frequency capability parameter may be a radio frequency capability parameter corresponding to one BWP on a target beam or a radio frequency capability parameter corresponding to a group of BWPs on a target beam.

Alternatively, the radio frequency capability parameter is a radio frequency capability parameter corresponding to one carrier or a radio frequency capability parameter corresponding to a group of carriers, the carrier is a carrier that has a corresponding numerology, and the group of carriers is a group of carriers that have a common numerology.

Alternatively, the radio frequency capability parameter may be a radio frequency capability parameter corresponding to one BWP or a radio frequency capability parameter corresponding to a group of BWPs.

Alternatively, the radio frequency capability parameter is a radio frequency capability parameter corresponding to one beam or a radio frequency capability parameter corresponding to a group of beams.

In some feasible implementations, the target beam may be a preset beam used for SRS switching and transmission, for example, may be a second beam. Alternatively, the target beam may be any preset beam. This is not limited in the embodiments of the present invention.

In an embodiment, the radio frequency capability parameter includes a calibration time or an adjustment time of a radio frequency module of the terminal device on a corresponding carrier, or a calibration time or an adjustment time of a radio frequency module of the terminal device on a corresponding beam.

If the radio frequency capability parameter corresponds to one beam, the corresponding beam may refer to the one beam. If the radio frequency capability parameter corresponds to a group of beams, the corresponding beam may refer to the group of beams. If the radio frequency capability parameter corresponds to a target beam, the corresponding beam may refer to the target beam.

If the radio frequency capability parameter correspond to one carrier on a target beam, the corresponding carrier may refer to the one carrier on the target beam. If the radio frequency capability parameter corresponds to a group of carriers on a target beam, the corresponding carrier may refer to the group of carriers. If the radio frequency capability parameter corresponds to one carrier, the corresponding carrier may refer to the one carrier. If the radio frequency capability parameter corresponds to a group of carriers, the corresponding carrier may refer to the group of carriers.

In an embodiment, the beamforming capability parameter of the terminal device includes a quantity of simultaneously supported beams and/or a carrier aggregation capability parameter; the quantity of simultaneously supported beams is a quantity of simultaneously supported beams for any one carrier or a plurality of carriers; and the carrier aggregation capability parameter includes an uplink carrier aggregation capability parameter of simultaneously supported carriers for any one beam or a plurality of beams, or a carrier aggregation capability parameter of simultaneously supported carriers for different beamwidths.

In an embodiment, the beamforming capability parameter of the terminal device may include a quantity of simultaneously supported beams and/or a BWP aggregation capability parameter. The quantity of simultaneously supported beams is a quantity of simultaneously supported beams for any one BWP or a plurality of BWPs. The carrier aggregation capability parameter includes an uplink BWP aggregation capability parameter of simultaneously supported BWPs for any one beam or a plurality of beams, or a BWP aggregation capability parameter of simultaneously supported BWPs for different beamwidths.

In an embodiment, the quantity of simultaneously supported beams may be a quantity of a group of carriers that have a same numerology. For example, if a quantity of carriers that have a same numerology is 6, the quantity of simultaneously supported beams may be 6.

Alternatively, the quantity of simultaneously supported beams may be a quantity of carriers that have respective corresponding numerologies. For example, if a quantity of carriers that have different numerologies is 6, the quantity of simultaneously supported beams may be 6.

Alternatively, the quantity of simultaneously supported beams is a quantity for one carrier that has a corresponding numerology. For example, the numerology may be pre-specified, and if a quantity of carriers that have the pre-specified numerology is 6, the quantity of simultaneously supported beams may be 6.

In other words, the quantity of simultaneously supported beams may be a quantity of simultaneously supported beams for each carrier, a specific carrier, or a group of carriers. Alternatively, the quantity of simultaneously supported beams may be a quantity of all beams.

In an embodiment, the simultaneously supported carriers may be carriers that have a same numerology. For example, the carrier aggregation capability may be an uplink capability of aggregating simultaneously supported carriers that have a same numerology for any one beam or a plurality of beams. The carrier aggregation capability parameter is an uplink carrier aggregation capability parameter of simultaneously supported carriers that have a same numerology for any one beam or a plurality of beams.

In an embodiment, the simultaneously supported BWPs may be BWPs that have a same numerology. For example, the BWP aggregation capability may be an uplink capability of aggregating simultaneously supported BWPs that have a same numerology for any one beam or a plurality of beams. The BWP aggregation capability parameter is an uplink BWP aggregation capability parameter of simultaneously supported BWPs that have a same numerology for any one beam or a plurality of beams.

Alternatively, the simultaneously supported carriers are carriers that have respective corresponding numerologies. For example, the carrier aggregation capability may be a capability of aggregating carriers that have different numerologies. The carrier aggregation capability parameter is an uplink carrier aggregation capability parameter of simultaneously supported carriers that have different numerologies for any one beam or a plurality of beams.

Alternatively, the simultaneously supported BWPs are BWPs that have respective corresponding numerologies. For example, the BWP aggregation capability may be a capability of aggregating BWPs that have different numerologies. The BWP aggregation capability parameter is an uplink BWP aggregation capability parameter of simultaneously supported BWPs that have different numerologies for any one beam or a plurality of beams.

Alternatively, the simultaneously supported carriers may be a carrier aggregation capability parameter of carriers that can be simultaneously supported for different beamwidths. For example, the carrier aggregation capability may be a capability of aggregating simultaneously supported carriers that have different beamwidths. The carrier aggregation capability parameter is a carrier aggregation capability parameter of simultaneously supported carriers for different beamwidths.

Alternatively, the simultaneously supported BWPs may be a BWP aggregation capability parameter of BWPs that can be simultaneously supported for different beamwidths. For example, the carrier aggregation capability may be a capability of aggregating simultaneously supported BWPs that have different beamwidths. The BWP aggregation capability parameter is a BWP aggregation capability parameter of simultaneously supported BWPs for different beamwidths.

S702: The network device receives the air interface signaling.

When SRS switching needs to be performed, the network device receives the air interface signaling sent by the terminal device.

S703: The network device determines configuration information that is on a second carrier/second beam and that is used to transmit an SRS.

In an embodiment, for second carriers/second beams that have different numerologies, locations of the SRS may be distinguished and indicated in advance. In other words, symbol information in the configuration information may include at least a start OFDM symbol location of the SRS on the second carrier/the second beam, or a start slot location of the SRS on the second carrier/the second beam. To be specific, when numerologies are different, start OFDM symbol locations or start slot locations that are configured for the SRS may be different. The start OFDM symbol location or the start slot location of the SRS is affected by the radio frequency capability parameter and/or the beamforming capability parameter that are and/or is reported by the terminal device. The network device may determine switched-to frequency domain information and beam information of the SRS based on the radio frequency capability parameter and/or the beamforming capability parameter that are and/or is carried in the air interface signaling and with reference to numerologies of the second beam/the second carrier (for example, a subcarrier spacing, where different subcarrier spacings have different OFDM symbol lengths). The frequency domain information is a carrier or a BWP.

In an embodiment, the network device may further determine other configuration information in time domain and other configuration information in frequency domain. Specifically, for a specific implementation process, refer to the corresponding description in step S302 or step S402 in the foregoing method embodiment. Details are not described herein.

In an embodiment, during dynamic trigger of aperiodic transmission, to reduce configuration costs, a pre-configured mode may be applied. Further, the mode is applicable to an effective application window, and some impossible locations are filtered out by using the application window to reduce the configuration costs.

For example, the mode may be semi-persistently configured, and in an embodiment, such a semi persistently configuration may be performed according to duration on the second carrier/the second beam.

In an embodiment, the application window to which the mode is applicable may be notified together with the mode by signaling to indicate an applicable time zone.

In an embodiment, the application window to which the mode is applicable may be notified separately from the mode by signaling to indicate the applicable time zone.

S704: The network device sends the configuration signaling to the terminal device by using signaling.

The signaling includes at least one of RRC signaling, MAC signaling, or PHY signaling.

S705: The terminal device receives the configuration information, and switches, based on the configuration information, the SRS from a first carrier/a second beam to the second carrier/the second beam for transmission.

If SRS carrier transfer is performed, the network device determines configuration information of the second carrier, and the terminal device transfers the SRS from the first carrier to the second carrier for transmission. If SRS beam transfer is performed, the network device determines configuration information of the second beam, and the terminal device transfers the SRS from the first beam to the second beam for transmission.

It should be noted that for specific implementation processes of steps S704 and S705, refer to the corresponding descriptions in steps S303 and S304 in the foregoing method embodiment, or refer to the corresponding descriptions in steps S403 and S404. Details are not described herein.

The mode may be a semi-persistent subframe mode, and the mode may be periodic or aperiodic, and may be uniform or non-uniform. When the second carrier has a relatively high requirement, a frequency of switching a subframe mode on the second carrier may be relatively high.

In an embodiment, for a case in which the mode is aperiodic, the mode may be triggered by a multiple-input multiple-output traffic request (MIMO Traffic Request), and the PHY signaling or the RRC signaling may be used for such trigger (activation or deactivation).

It can be learned that, in this embodiment of the present invention, the network device may receive the air interface signaling that includes the radio frequency capability parameter and/or the beamforming capability parameter of the terminal device, and may determine related configuration information based on the air interface signaling that includes the radio frequency capability parameter and/or the beamforming capability parameter of the terminal device, and then send the configuration information to the terminal device by using signaling. The terminal device receives the configuration information, and switches, based on the configuration information, the SRS from the first carrier/the first beam to the second carrier/the second beam for transmission. This enables the determined configuration information to be more accurate, and correct SRS configuration is ensured when the terminal device performs SRS switching.

Figure 8:
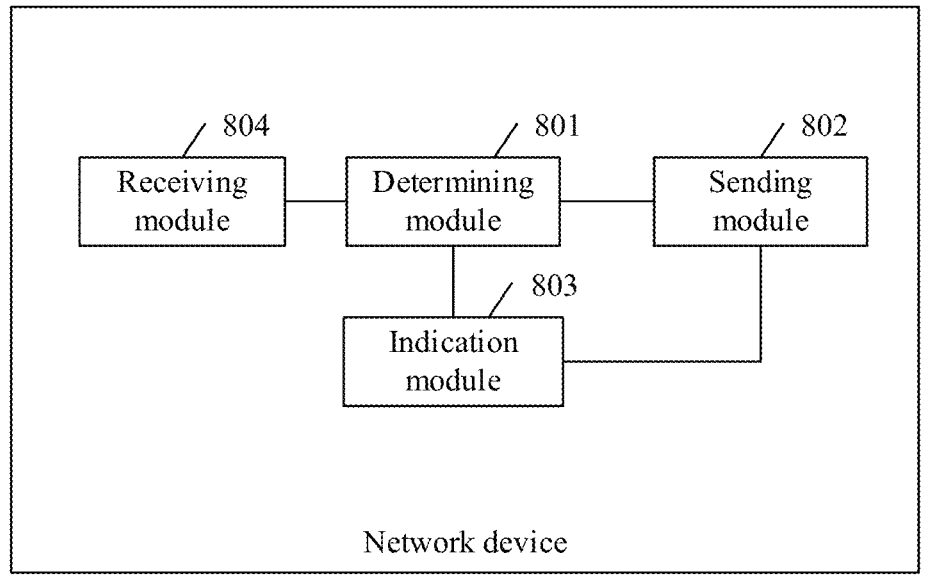
FIG. 8 is a schematic structural diagram of a network device according to an embodiment of the present invention.

The foregoing describes in detail the method in the embodiments of the present invention. To better implement the foregoing solutions in the embodiments of the present invention, the following describes a corresponding apparatus embodiment. Details are shown in FIG. 8. FIG. 8 is a schematic structural diagram of a network device according to an embodiment of the present invention. The network device may include:

a determining module 801, configured to determine configuration information that is on a second carrier and/or a second beam and that is used to transmit a sounding reference signal SRS, where the second carrier is a switched-to carrier used to send the SRS, and the second beam is a switched-to beam used to send the SRS; and a sending module 802, configured to send the configuration information to a terminal device, so that the terminal device switches, based on the configuration information, the SRS from a first carrier and/or a first beam to the second carrier and/or the second beam for transmission, where the first carrier is a carrier from which the SRS is switched, and the first beam is a beam from which the SRS is switched.

The configuration information includes at least one of symbol information, slot information, and/or frequency band information. A numerology of the first carrier and a numerology of the second carrier are the same or different, and the numerology includes a subcarrier spacing and/or a waveform parameter.

In an embodiment, the configuration information is sent to the terminal device by using at least one of PHY signaling, RRC signaling, or MAC signaling.

The PHY signaling is signaling sent through a group physical downlink control channel or by using group downlink control information.

In an embodiment, the frequency band information is partial frequency band information or carrier information.

In an embodiment, the configuration information further includes a frequency band correspondence; and the frequency band correspondence is a relationship between a frequency band of the second carrier to which the SRS is switched and a frequency band corresponding to the numerology; and/or the frequency band correspondence is a relationship between a frequency band on the second beam to which the SRS is switched and a frequency band corresponding to a numerology.

In an embodiment, the symbol information is used to indicate symbol information in a first time period, and the first time period is a time period determined based on a numerology of a third carrier and the numerology of the second carrier.

In an embodiment, the network device further includes a first indication module 803, configured to indicate the first time period to the terminal device by using RRC signaling or PHY signaling.

In an embodiment, the third carrier is the first carrier or a carrier other than the second carrier.

In an embodiment, the SRS is a periodic SRS or an aperiodic SRS. The network device further includes a second indication module 803, configured to: if the SRS is an aperiodic SRS, trigger, by the network device by using an SRS request, the terminal device to transmit the aperiodic SRS, and indicate the configuration information to the terminal device; or if the SRS is a periodic SRS, indicate, by the network device, the configuration information to the terminal device.

In an embodiment, the frequency band information is sent to the terminal device through the group physical downlink control channel, and the symbol information and/or the slot information are and/or is sent to the terminal device by using at least one of the MAC signaling or the RRC signaling.

Alternatively, the symbol information and/or the slot information are and/or is sent to the terminal device through the group physical downlink control channel, and the frequency band information is sent to the terminal device by using at least one of the MAC signaling or the RRC signaling.

Alternatively, the symbol information and/or the slot information are and/or is sent to the terminal device through the group physical downlink control channel, and the frequency band information is sent to the terminal device through the group physical downlink control channel.

In an embodiment, the network device further includes a receiving module 804, configured to receive, when SRS switching needs to be performed, air interface signaling sent by the terminal device, where the air interface signaling is used to indicate a beamforming capability parameter of the terminal device and/or a radio frequency capability parameter to the network device.

In an embodiment, the radio frequency capability parameter is a radio frequency capability parameter corresponding to one carrier on a target beam or a radio frequency capability parameter corresponding to a group of carriers on a target beam, the carrier is a carrier that has a corresponding numerology, and the group of carriers is a group of carriers that have a common numerology.

Alternatively, the radio frequency capability parameter is a radio frequency capability parameter corresponding to one beam or a radio frequency capability parameter corresponding to a group of beams.

In an embodiment, the radio frequency capability parameter includes a calibration time or an adjustment time of a radio frequency module of the terminal device on a corresponding carrier, or a calibration time or an adjustment time of a radio frequency module of the terminal device on a corresponding beam.

In an embodiment, the beamforming capability parameter of the terminal device includes a quantity of simultaneously supported beams and/or a carrier aggregation capability parameter; the quantity of simultaneously supported beams is a quantity of simultaneously supported beams for any one carrier or a plurality of carriers; and the carrier aggregation capability parameter is an uplink carrier aggregation capability parameter of simultaneously supported carriers for any one beam or a plurality of beams, or a carrier aggregation capability parameter of simultaneously supported carriers for different beamwidths.

In an embodiment, the simultaneously supported carriers are carriers that have a same numerology, or the simultaneously supported carriers are carriers that have respective corresponding numerologies.

In an embodiment, the quantity of simultaneously supported beams is a quantity of a group of carriers that have a same numerology; or the quantity of simultaneously supported beams is a quantity of carriers that have respective corresponding numerologies; or the quantity of simultaneously supported beams is a quantity for one carrier that has a corresponding numerology.

Figure 9:
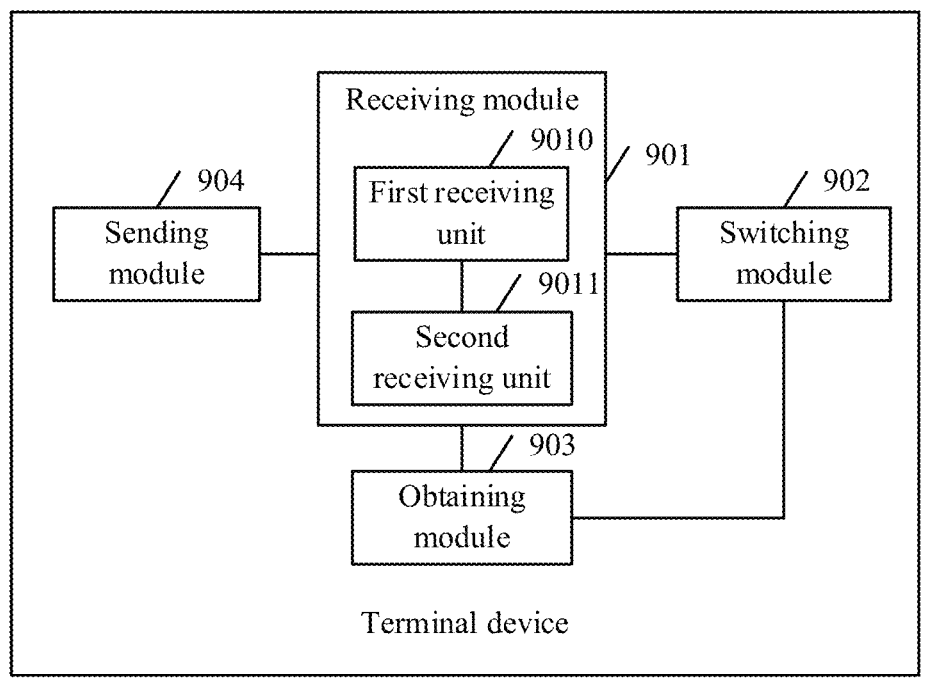
FIG. 9 is a schematic structural diagram of a terminal device according to an embodiment of the present invention.

FIG. 9 is a schematic structural diagram of a terminal device according to an embodiment of the present invention. The terminal device described in this embodiment of the present invention may include:

a receiving module 901, configured to receive configuration information that is on a second carrier and/or a second beam, that is used to transmit a sounding reference signal SRS, and that is sent by a network device, where the configuration information includes at least one of symbol information, slot information, and/or frequency band information; and a switching module 902, configured to switch, based on the configuration information, the SRS from a first carrier and/or a first beam to the second carrier and/or the second beam for transmission, where the first carrier is a carrier from which the SRS is switched, and the first beam is a beam from which the SRS is switched.

A numerology of the first carrier and a numerology of the second carrier are the same or different, and the numerology includes a subcarrier spacing and/or a waveform parameter.

In an embodiment, the configuration information is sent to the terminal device by using at least one of PHY signaling, RRC signaling, or MAC signaling.

The PHY signaling is sent through a group physical downlink control channel or by using group downlink control information.

In an embodiment, the frequency band information is partial frequency band information or carrier information.

In an embodiment, the configuration information further includes a frequency band correspondence; and the frequency band correspondence is a relationship between a frequency band of the second carrier to which the SRS is switched and a frequency band corresponding to the numerology; and/or the frequency band correspondence is a relationship between a frequency band on the second beam to which the SRS is switched and a frequency band corresponding to a numerology.

In an embodiment, the symbol information is used to indicate symbol information in a first time period, and the first time period is determined based on a numerology of a third carrier and the numerology of the second carrier; or the symbol information is used to indicate symbol information in a first timing, and the first timing is determined based on the numerology of the second carrier; or the symbol information is used to indicate symbol information determined based on the numerology of the second carrier.

In an embodiment, the terminal device further includes an obtaining module 903, configured to obtain the first time period or the first timing by using RRC signaling or PHY signaling.

In an embodiment, the SRS is a periodic SRS or an aperiodic SRS, and the receiving module 901 includes:

a first receiving unit 9010, configured to: if the SRS is an aperiodic SRS, receive an SRS request that is sent by the network device and configuration information that is on the second carrier and/or the second beam, that is used to transmit the aperiodic sounding reference signal SRS, and that is sent by the network device, where the SRS request is used to trigger the terminal device to transmit the aperiodic SRS; and a second receiving unit 9011, configured to: if the SRS is a periodic SRS, receive configuration information that is on the second carrier and/or the second beam, that is used to transmit the aperiodic sounding reference signal SRS, and that is sent by the network device.

In an embodiment, the receiving module 901 receives the frequency band information through the group physical downlink control channel or by using the group downlink control information, and receives the symbol information and/or the slot information by using at least one of the MAC signaling or the RRC signaling.

Alternatively, the receiving module 901 receives the symbol information and/or the slot information through the group physical downlink control channel or by using the group downlink control information, and receives the frequency band information by using at least one of the MAC signaling or the RRC signaling.

Alternatively, the receiving module 901 receives the symbol information and/or the slot information through the group physical downlink control channel or by using the group downlink control information, and receives the frequency band information through the group physical downlink control channel or by using the group downlink control information.

In an embodiment, the network device further includes a sending module 904, configured to send, by the terminal device, air interface signaling to the network device when SRS switching needs to be performed, where the air interface signaling is used to indicate a beamforming capability parameter of the terminal device and/or a radio frequency capability parameter to the network device.

In an embodiment, the radio frequency capability parameter is a radio frequency capability parameter corresponding to one carrier on a target beam or a radio frequency capability parameter corresponding to a group of carriers on a target beam, the carrier is a carrier that has a corresponding numerology, and the group of carriers is a group of carriers that have a common numerology.

Alternatively, the radio frequency capability parameter is a radio frequency capability parameter corresponding to one beam or a radio frequency capability parameter corresponding to a group of beams.

In an embodiment, the radio frequency capability parameter includes a calibration time or an adjustment time of a radio frequency module of the terminal device on a corresponding carrier, or a calibration time or an adjustment time of a radio frequency module of the terminal device on a corresponding beam.

In an embodiment, the beamforming capability parameter of the terminal device includes a quantity of simultaneously supported beams and/or a carrier aggregation capability parameter; the quantity of simultaneously supported beams is a quantity of simultaneously supported beams for any one carrier or a plurality of carriers; and the carrier aggregation capability parameter is an uplink carrier aggregation capability parameter of simultaneously supported carriers for any one beam or a plurality of beams, or a carrier aggregation capability parameter of simultaneously supported carriers for different beamwidths.

In an embodiment, the simultaneously supported carriers are carriers that have a same numerology, or the simultaneously supported carriers are carriers that have respective corresponding numerologies.

In an embodiment, the quantity of simultaneously supported beams is a quantity of a group of carriers that have a same numerology; or the quantity of simultaneously supported beams is a quantity of carriers that have respective corresponding numerologies; or the quantity of simultaneously supported beams is a quantity for one carrier that has a corresponding numerology.

Figure 10:
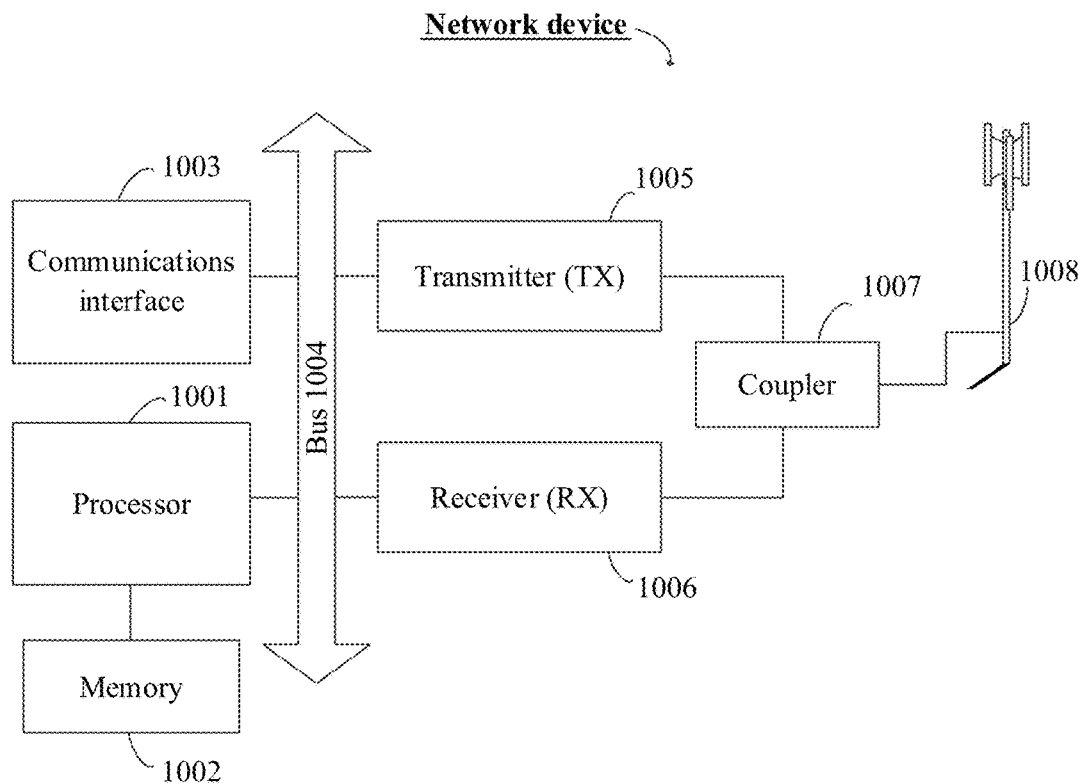
FIG. 10 is a schematic structural diagram of another network device according to an embodiment of the present invention.

FIG. 10 is a schematic structural diagram of another network device according to an embodiment of the present invention. The network device described in this embodiment includes one or more processors 1001, a memory 1002, a communications interface 1003, a transmitter 1005, a receiver 1006, a coupler 1007, and an antenna 1008. These components may be connected by using a bus 1004 or in another manner.

The communications interface 1003 may be configured for communication between the network device and another communications device, for example, a terminal device or another network device. Specifically, the terminal device may be a first terminal shown in this application. Specifically, the communications interface 1003 may be a long term evolution (LTE) (4G) communications interface, or may be a 5G communications interface or a future new radio (NR) communications interface. A wireless communications interface is not limited thereto. The network device may be further provided with a wired communications interface 1003 to support wired communication. For example, a backhaul connection between one network device and another network device may be a wired communication connection.

The transmitter 1005 may be configured to perform transmission processing, for example, signal modulation, on a signal output by the processor 1001. The receiver 1006 may be configured to perform reception processing, for example, signal demodulation, on a mobile communications signal received by the antenna 1008. In some embodiments of this application, the transmitter 1005 and the receiver 1006 may be considered as a wireless modem. There may be one or more transmitters 1005 and one or more receivers 1006 in the network device. The antenna 1008 may be configured to convert electromagnetic energy in a transmission line into an electromagnetic wave in free space, or convert an electromagnetic wave in free space into electromagnetic energy in a transmission line. The coupler 1007 may be configured to divide the mobile communications signal into a plurality channels of signals and allocate the plurality of signals to a plurality of receivers 1006.

The memory 1002 is coupled to the processor 1001, and is configured to store various software programs and/or a plurality of groups of instructions. Specifically, the memory 1002 may include a high-speed random access memory, or may include a non-volatile memory, for example, one or more disk storage devices, flash memory devices, or other non-volatile solid-state storage devices. The memory 1002 may store an operating system (hereinafter referred to as a system), for example, an embedded operating system such as uCOS, VxWorks, or RTLinux. The memory 1002 may further store a program. The program may be used to communicate with one or more attached devices, one or more terminal devices, or one or more network devices.

The processor 1001 may be configured to perform radio channel management, implement call and communication link establishment and removal, perform power control for a terminal in a control area, and the like. Specifically, the processor 1001 may include an administration/communication module (AM/CM) (configured as a center of speech channel switching and information exchange), a basic module (BM) (configured to complete functions of call processing, signaling processing, radio resource management, radio link management, and circuit maintenance), a transcoder and submultiplexer (TCSM) (configured to complete functions of multiplexing/demultiplexing and code conversion) and the like.

In this embodiment of the present invention, the processor 1001 may be configured to read and execute a computer-readable instruction. Specifically, the processor 1001 may be configured to invoke the program stored in the memory 1002, for example, an implementation program of a parameter adjustment method provided in one or more embodiments of this application on a network device side; and perform the following steps:

determining configuration information that is on a second carrier and/or a second beam and that is used to transmit a sounding reference signal SRS, where the second carrier is a switched-to carrier used to send the SRS; and the second beam is a switched-to beam used to send the SRS; and sending the configuration information to a terminal device, so that the terminal device switches, based on the configuration information, the SRS from a first carrier and/or a first beam to the second carrier and/or the second beam for transmission, where the first carrier is a carrier from which the SRS is switched, and the first beam is a beam from which the SRS is switched.

The configuration information includes at least one of symbol information, slot information, and/or frequency band information. A numerology of the first carrier and a numerology of the second carrier are the same or different, and the numerology includes a subcarrier spacing and/or a waveform parameter.

In an embodiment, the configuration information is sent to the terminal device by using at least one of PHY signaling, RRC signaling, or MAC signaling. The PHY signaling is signaling sent through a group physical downlink control channel or by using group downlink control information.

In an embodiment, the frequency band information is partial frequency band information or carrier information.

In an embodiment, the configuration information further includes a frequency band correspondence; and the frequency band correspondence is a relationship between a frequency band of the second carrier to which the SRS is switched and a frequency band corresponding to the numerology; and/or the frequency band correspondence is a relationship between a frequency band on the second beam to which the SRS is switched and a frequency band corresponding to a numerology.

In an embodiment, the symbol information is used to indicate symbol information in a first time period, and the first time period is a time period determined based on a numerology of a third carrier and the numerology of the second carrier.

Alternatively, the symbol information is used to indicate symbol information in a first timing, and the first timing is a timing determined based on the numerology of the second carrier.

Alternatively, the symbol information is used to indicate symbol information determined based on the numerology of the second carrier.

In an embodiment, the processor 1001 is further configured to indicate the first time period or the first timing to the terminal device by using RRC signaling or PHY signaling.

In an embodiment, the third carrier is the first carrier or a carrier other than the second carrier.

In an embodiment, the SRS is a periodic SRS or an aperiodic SRS.

The processor 1001 is configured to send the configuration information to the terminal device, and is specifically configured to: if the SRS is an aperiodic SRS, trigger, by using an SRS request, the terminal device to transmit the aperiodic SRS, and indicate the configuration information to the terminal device; or if the SRS is a periodic SRS, send the configuration information to the terminal device.

In an embodiment, the frequency band information is sent to the terminal device through the group physical downlink control channel or the group control information, and the symbol information and/or the slot information are and/or is sent to the terminal device by using at least one of the MAC signaling or the RRC signaling.

Alternatively, the symbol information and/or the slot information are and/or is sent to the terminal device through the group physical downlink control channel or the group downlink control information, and the frequency band information is sent to the terminal device by using at least one of the MAC signaling or the RRC signaling.

Alternatively, the symbol information and/or the slot information are and/or is sent to the terminal device through the group physical downlink control channel or by using the group downlink control information, and the frequency band information is sent to the terminal device through the group physical downlink control channel or by using the group downlink control information.

In an embodiment, the processor 1001 is further configured to receive, when SRS switching needs to be performed, air interface signaling sent by the terminal device, where the air interface signaling is used to indicate a beamforming capability parameter of the terminal device and/or a radio frequency capability parameter.

In an embodiment, the radio frequency capability parameter is a radio frequency capability parameter corresponding to one carrier on a target beam or a radio frequency capability parameter corresponding to a group of carriers on a target beam, the carrier is a carrier that has a corresponding numerology, and the group of carriers is a group of carriers that have a common numerology. Alternatively, the radio frequency capability parameter is a radio frequency capability parameter corresponding to one beam or a radio frequency capability parameter corresponding to a group of beams.

In an embodiment, the radio frequency capability parameter includes a calibration time or an adjustment time of a radio frequency module of the terminal device on a corresponding carrier, or a calibration time or an adjustment time of a radio frequency module of the terminal device on a corresponding beam.

In an embodiment, the beamforming capability parameter of the terminal device includes a quantity of simultaneously supported beams and/or a carrier aggregation capability parameter; the quantity of simultaneously supported beams is a quantity of simultaneously supported beams for any one carrier or a plurality of carriers; and the carrier aggregation capability parameter is an uplink carrier aggregation capability parameter of simultaneously supported carriers for any one beam or a plurality of beams, or a carrier aggregation capability parameter of simultaneously supported carriers for different beamwidths.

In an embodiment, the simultaneously supported carriers are carriers that have a same numerology, or the simultaneously supported carriers are carriers that have respective corresponding numerologies.

In an embodiment, the quantity of simultaneously supported beams is a quantity of a group of carriers that have a same numerology; or the quantity of simultaneously supported beams is a quantity of carriers that have respective corresponding numerologies; or the quantity of simultaneously supported beams is a quantity for one carrier that has a corresponding numerology.

It may be understood that, the network device may be a base station in the system shown in FIG. 1, and may be implemented as a base transceiver station, a wireless transceiver, a basic service set (BSS), an extended service set (ESS), a NodeB, an eNodeB, an access point, a TRP, or the like.

It should be noted that the network device shown in FIG. 10 is merely an implementation of this embodiment of the present invention. In practical application, the network device may further include more or fewer components. This is not limited herein.

Through the group PDCCH described in this application may be replaced with by using the group DCI.

It should be understood that this embodiment of the present invention is a physical apparatus embodiment corresponding to the method embodiment, and the description of the method embodiment is also applicable to this embodiment of the present invention.

Figure 11:
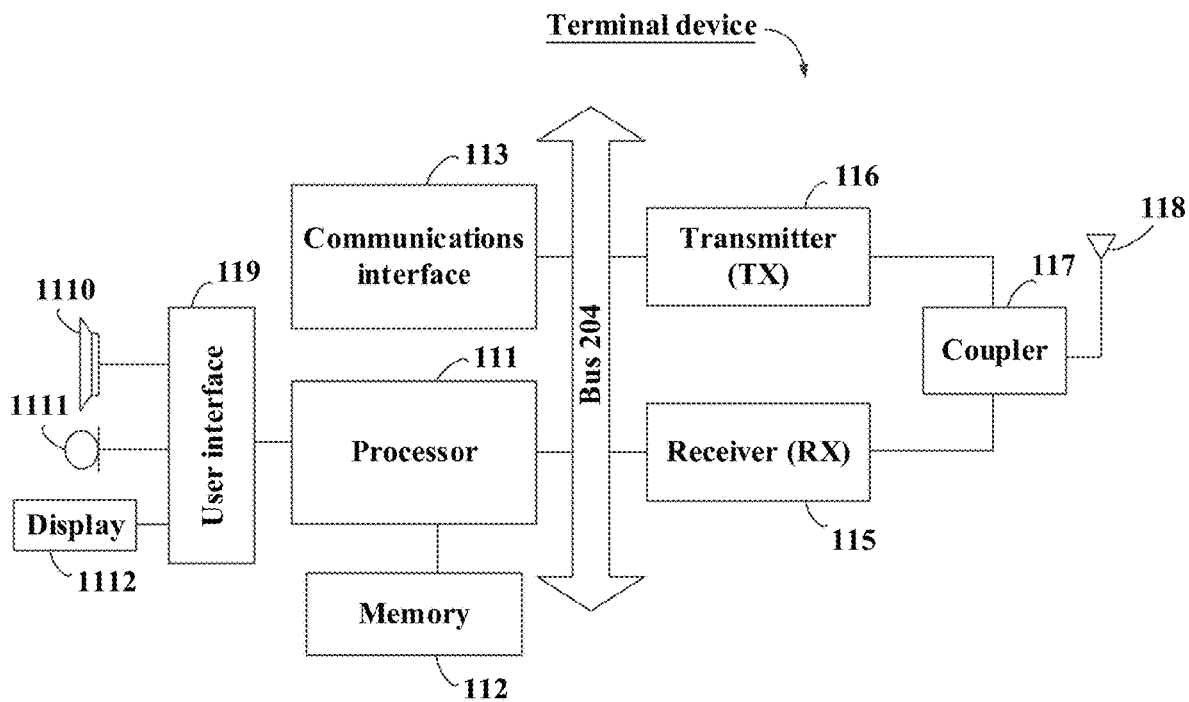
FIG. 11 is a schematic structural diagram of another terminal device according to an embodiment of the present invention.

FIG. 11 is a schematic structural diagram of another terminal device according to an embodiment of the present invention. The network device described in this embodiment includes: one or more processors 111, a memory 112, a communications interface 113, a receiver 115, a transmitter 116, a coupler 117, an antenna 118, a user interface 112, and an input/output module (including an audio input/output module 1110, a key input module 1111, a display 1112, and the like). These components may be connected by using a bus 114 or in another manner. In FIG. 2, an example in which the components are connected by using a bus is used.

The communications interface 113 may be used for communication between the terminal device and another communications device, for example, a network device. Specifically, the network device may be the network device 300 shown in FIG. 3. Specifically, the communications interface 113 may be a long term evolution (LTE) (4G) communications interface, or may be a 5G communications interface or a future new radio communications interface. A wireless communications interface is not limited thereto. The terminal device may be further provided with a wired communications interface 113, for example, a local access network (Local Access Network, LAN) interface.

The transmitter 116 may be configured to perform transmission processing, for example, signal modulation, on a signal output by the processor 111. The receiver 115 may be configured to perform reception processing, for example, signal demodulation, on a mobile communications signal received by the antenna 118. In some embodiments of this application, the transmitter 116 and the receiver 115 may be considered as a wireless modem. There may be one or more transmitters 116 and one or more receivers 115 in the terminal device. The antenna 118 may be configured to convert electromagnetic energy in a transmission line into an electromagnetic wave in free space, or convert an electromagnetic wave in free space into electromagnetic energy in a transmission line. The coupler 117 is configured to divide the mobile communications signal received by the antenna 118 into a plurality channels of signals and allocate the plurality of signals to a plurality of receivers 115.

In addition to the transmitter 116 and the receiver 115 that are shown in FIG. 11, the terminal device may further include other communications components, for example, a GPS module, a Bluetooth module, and a wireless fidelity (Wi-Fi) module. The foregoing wireless communications signal is not limited thereto. The terminal device may further support another wireless communications signal, for example, a satellite signal, or a short-wave signal. Wireless communication is not limited thereto. The terminal device may be further provided with a wired network interface (for example, a LAN interface) to support wired communication.

The input/output module may be configured to implement interaction between the terminal device and a user/an external environment, and may mainly include the audio input/output module 1110, the key input module 1111, the display 1112, and the like. Specifically, the input/output module may further include a camera, a touchscreen, a sensor, and the like. All the input/output modules communicate with the processor 111 through the user interface 119.

The memory 112 is coupled to the processor 111, and is configured to store various software programs and/or a plurality of groups of instructions. Specifically, the memory 112 may include a high-speed random access memory, or may include a non-volatile memory, for example, one or more disk storage devices, flash memory devices, or other non-volatile solid-state storage devices. The memory 112 may store an operating system (hereinafter referred to as a system), for example, an embedded operating system such as ANDROID, IOS, WINDOWS, or LINUX. The memory 112 may further store a network communications program. The network communications program may be used for communication with one or more attached devices, one or more terminal devices, and one or more network devices. The memory 112 may further store a user interface program. The user interface program may vividly display content of an application program through a graphical operation interface, and receive a control operation performed by a user on the application program by using an input control such as a menu, a dialog box, or a key.

In some embodiments of this application, the memory 112 may be configured to store an implementation program of the method provided in one or more embodiments of this application on a terminal device side.

In this embodiment of the present invention, the processor 1101 may be configured to read and execute a computer-readable instruction. Specifically, the processor 1001 may be configured to invoke the program stored in the memory 1002, for example, an implementation program of a parameter adjustment method provided in one or more embodiments of this application on a network device side; and perform the following steps:

receiving configuration information that is on a second carrier and/or a second beam, that is used to transmit a sounding reference signal SRS, and that is sent by a network device, where the configuration information includes at least one of symbol information, slot information, and/or frequency band information; and switching, based on the configuration information, the SRS from a first carrier and/or a first beam to the second carrier and/or the second beam for transmission, where the first carrier is a carrier from which the SRS is switched, and the first beam is a beam from which the SRS is switched.

A numerology of the first carrier and a numerology of the second carrier are the same or different, and the numerology includes a subcarrier spacing and/or a waveform parameter.

In an embodiment, the configuration information is sent to the terminal device by using at least one of PHY signaling, RRC signaling, and MAC signaling. The PHY signaling is signaling sent through a group physical downlink control channel or by using group downlink control information.

In an embodiment, the frequency band information is partial frequency band information or carrier information.

In an embodiment, the configuration information further includes a frequency band correspondence; and the frequency band correspondence is a relationship between a frequency band of the second carrier to which the SRS is switched and a frequency band corresponding to the numerology; and/or the frequency band correspondence is a relationship between a frequency band on the second beam to which the SRS is switched and a frequency band corresponding to a numerology.

In an embodiment, the symbol information is used to indicate symbol information in a first time period, and the first time period is a time period determined based on a numerology of a third carrier and the numerology of the second carrier.

Alternatively, the symbol information is used to indicate symbol information in a first timing, and the first timing is a timing determined based on the numerology of the second carrier.

Alternatively, the symbol information is used to indicate symbol information determined based on the numerology of the second carrier.

In an embodiment, the processor 111 is further configured to obtain the first time period or the first timing by using RRC signaling, MAC signaling, or PHY signaling.

In an embodiment, the SRS is a periodic SRS or an aperiodic SRS.

The processor 111 is configured to receive the configuration information that is on the second carrier and/or the second beam, that is used to transmit the sounding reference signal SRS, and that is sent by the network device, and is specifically configured to: if the SRS is an aperiodic SRS, receive an SRS request that is sent by the network device and configuration information that is on the second carrier and/or the second beam, that is used to transmit the aperiodic sounding reference signal SRS, and that is sent by the network device, where the SRS request is used to trigger the terminal device to transmit the aperiodic SRS; or if the SRS is a periodic SRS, receive configuration information that is on the second carrier and/or the second beam, that is used to transmit the aperiodic sounding reference signal SRS, and that is sent by the network device.

In an embodiment, the processor 111 receives the frequency band information through the group physical downlink control channel or by using the group downlink control information, and receives the symbol information and/or the slot information by using at least one of the MAC signaling or the RRC signaling.

Alternatively, the processor 111 receives the symbol information and/or the slot information through the group physical downlink control channel or by using the group downlink control information, and receives the frequency band information by using at least one of the MAC signaling or the RRC signaling.

Alternatively, the processor 111 receives the symbol information and/or the slot information through the group physical downlink control channel or by using the group downlink control information, and receives the frequency band information through the group physical downlink control channel or by using the group downlink control information.

In an embodiment, the processor 111 is further configured to send, by the terminal device, air interface signaling to the network device when SRS switching needs to be performed, where the air interface signaling is used to indicate a beamforming capability parameter of the terminal device and/or a radio frequency capability parameter to the network device.

In an embodiment, the radio frequency capability parameter is a radio frequency capability parameter corresponding to one carrier on a target beam or a radio frequency capability parameter corresponding to a group of carriers on a target beam, the carrier is a carrier that has a corresponding numerology, and the group of carriers is a group of carriers that have a common numerology.

Alternatively, the radio frequency capability parameter is a radio frequency capability parameter corresponding to one beam or a radio frequency capability parameter corresponding to a group of beams.

In an embodiment, the radio frequency capability parameter includes a calibration time or an adjustment time of a radio frequency module of the terminal device on a corresponding carrier, or a calibration time or an adjustment time of a radio frequency module of the terminal device on a corresponding beam.

In an embodiment, the beamforming capability parameter of the terminal device includes a quantity of simultaneously supported beams and/or a carrier aggregation capability parameter; the quantity of simultaneously supported beams is a quantity of simultaneously supported beams for any one carrier or a plurality of carriers; and the carrier aggregation capability parameter is an uplink carrier aggregation capability parameter of simultaneously supported carriers for any one beam or a plurality of beams, or a carrier aggregation capability parameter of simultaneously supported carriers for different beamwidths.

In an embodiment, the simultaneously supported carriers are carriers that have a same numerology, or the simultaneously supported carriers are carriers that have respective corresponding numerologies.

In an embodiment, the quantity of simultaneously supported beams is a quantity of a group of carriers that have a same numerology; or the quantity of simultaneously supported beams is a quantity of carriers that have respective corresponding numerologies; or the quantity of simultaneously supported beams is a quantity for one carrier that has a corresponding numerology.

It may be understood that, the terminal device may be the terminal device 103 in the system shown in FIG. 1, and may be implemented as a mobile device, a mobile station (mobile station), a mobile unit (mobile unit), a radio unit, a remote unit, a user agent, a mobile client, or the like.

It should be noted that, the terminal device shown in FIG. 11 is merely an implementation of this embodiment of this application. In practical application, the terminal device may further include more or fewer components. This is not limited herein.

Another embodiment of the present invention provides a computer-readable storage medium. The computer-readable storage medium stores a program. When the program is executed by a processor, the method shown in the terminal device in this application or the method shown in the network device may be implemented.

It should be noted that, for a specific process in which the computer-readable storage medium is executed by the processor, refer to the method described in the foregoing method embodiment. Details are not described herein.

Still another embodiment of the present invention further provides a computer program product including an instruction. When the computer program product is run on a computer, the computer is enabled to perform the method described in the foregoing method embodiment.

The computer-readable storage medium may be an internal storage unit of the terminal described in any one of the foregoing embodiments, for example, a hard disk or a memory of the terminal. The computer-readable storage medium may be alternatively an external storage device of the computer, for example, a pluggable hard disk that is equipped on the computer, a smart media card (Smart Media Card, SMC), a secure digital (Secure Digital, SD) card, or a flash memory card (Flash Card). Further, the computer-readable storage medium may alternatively include both the internal storage unit of the terminal and the external storage device. The computer-readable storage medium is configured to store the program and other programs and data required by the terminal. The computer-readable storage medium may be further configured to temporarily store data that has been output or is to be output.

Based on a same inventive concept, a principle of resolving a problem by a computer provided in this embodiment of the present invention is similar to that of the method embodiment of the present invention. Therefore, for implementation of the computer, refer to the implementation of the method. For brevity, details are not described herein.

A person of ordinary skill in the art may understand that all or some of the processes of the methods in the embodiments may be implemented by a program instructing relevant hardware. The program may be stored in a computer-readable storage medium. When the program is run, the processes of the methods in the embodiments are performed. The foregoing storage medium may be a magnetic disk, an optical disc, a read-only memory (Read-Only Memory, ROM), a random access memory (Random Access Memory, RAM), or the like.

The signal configuration method and the related device provided in the embodiments of the present invention are described in detail above. The principle and implementations of the present invention are described in this specification by using specific examples. The description about the embodiments is merely intended to help understand the structure, the method, and core ideas of the present invention. In addition, a person of ordinary skill in the art can make variations to the specific implementations and application scopes according to the ideas of the present invention. In summary, the content of this specification shall not be construed as a limitation to the present invention.

What is claimed is:

1. A signal configuration method, comprising:
   determining, by a network device, configuration information for transmitting a sounding reference signal SRS, wherein the configuration information comprises at least one of slot information or symbol information;
   sending, by the network device the configuration information to the terminal device;
   sending an SRS request to the terminal device for instructing the terminal device to switch, based on the configuration information and the SRS request, from a first carrier to a second carrier to transmit the SRS;
   wherein a start slot location on the second carrier for transmission of the SRS is determined based on comparison between a subcarrier spacing of the second carrier and a subcarrier spacing of a third carrier; and/or
   a start symbol location on the second carrier for transmission of the SRS is determined based on comparison between a subcarrier spacing of the second carrier and a subcarrier spacing of a third carrier, and further based on a radio frequency parameter or a beamforming capability parameter received by the network device;
   wherein the comparison between the subcarrier spacing of the second carrier and the subcarrier spacing of the third carrier comprises determining a common slot length or OFDM symbol duration of the second carrier and the third carrier; or
   the comparison between the subcarrier spacing of the second carrier and the subcarrier spacing of the third carrier is determined based on a slot length or OFDM symbol duration of a smaller subcarrier spacing between the second carrier and the third carrier; and
   wherein the first carrier is a switched-from carrier, the second carrier is a switched-to carrier, and the third carrier is a switching indication carrier.

2. The method according to claim 1, wherein:
   the start slot location on the second carrier for transmission of the SRS is determined based on the comparison between the subcarrier spacing of the second carrier and the subcarrier spacing of the third carrier and a radio frequency capability parameter of the terminal device; and/or the start symbol location on the second carrier for transmission of the SRS is determined based on the comparison between the subcarrier spacing of the second carrier and the subcarrier spacing of the third carrier and a radio frequency capability parameter of the terminal device.

3. The method according to claim 1, wherein the first carrier comprises a supplementary uplink carrier, the second carrier comprises a supplementary uplink carrier.

4. The method according to claim 1, wherein the slot information comprises a plurality of slot configuration, wherein the plurality of slot configuration occupied by the SRS are aperiodic, and the plurality of slot configuration is triggered by radio resource control layer, RRC, signaling.

5. The method according to claim 1, wherein the SRS request indicates transmitting aperiodic SRS.

6. A signal configuration method, comprising:
receiving, by a terminal device from a network device, configuration information, wherein the configuration information comprises at least one of symbol information, or slot information;
receiving an SRS request from the network device; and
switching, by the terminal device based on the configuration information, and the SRS request from a first carrier to a second carrier;
wherein
a start slot location on the second carrier for transmission of the SRS is determined based on comparison between a subcarrier spacing of the second carrier and a subcarrier spacing of a third carrier; and/or
a start symbol location on the second carrier for transmission of the SRS is determined based on comparison between a subcarrier spacing of the second carrier and a subcarrier spacing of a third carrier;
wherein the start slot location and the start symbol location are further determined by a radio frequency parameter or a beamforming capability parameter sent to the network device;
wherein the comparison between the subcarrier spacing of the second carrier and the subcarrier spacing of the third carrier comprises determining a common slot length or OFDM symbol duration of the second carrier and the third carrier; or
the comparison between the subcarrier spacing of the second carrier and the subcarrier spacing of the third carrier is determined based on a slot length or OFDM symbol duration of a smaller subcarrier spacing between the second carrier and the third carrier, and
wherein the first carrier is a SRS switch-from carrier, the second carrier is a switched-to carrier, the third carrier is an SRS carrier switching indication carrier.

7. The method according to claim 6, wherein:
the start slot location on the second carrier for transmission of the SRS is determined based on the comparison between the subcarrier spacing of the second carrier and the subcarrier spacing of the third carrier and a radio frequency capability parameter of the terminal device; and/or
the start symbol location on the second carrier for transmission of the SRS is determined based on the comparison between the subcarrier spacing of the second carrier and the subcarrier spacing of the third carrier and a radio frequency capability parameter of the terminal device.

8. The method according to claim 6, wherein the first carrier comprises a supplementary uplink carrier, the second carrier comprises a supplementary uplink carrier.

9. The method according to claim 6, wherein the slot information comprises a plurality of slot configuration, wherein the plurality of slot configuration occupied by the SRS are aperiodic, and the plurality of slot configuration is triggered by radio resource control layer, RRC, signaling.

10. The method according to claim 6, wherein the SRS request indicates transmitting aperiodic SRS.

11. A terminal device, comprising:
a memory, configured to store a program; and
a processor, configured to execute the program in the memory, the program comprising the steps of:
receiving, from a network device, configuration information wherein the configuration information comprises at least one of symbol information or slot information;
receiving an SRS request form the network device; and
switching based on the configuration information and the SRS request, from a first carrier to a second carrier to transmit the SRS; wherein
a start slot location on the second carrier for transmission of the SRS is determined based on comparison between a subcarrier spacing of the second carrier and a subcarrier spacing of a third carrier; and/or
a start symbol location on the second carrier for transmission of the SRS is determined based on comparison between a subcarrier spacing of the second carrier and a subcarrier spacing of a third carrier,
wherein, the start slot location and start symbol location are determined further by a radio frequency parameter or a beamforming capability parameter sent to the network device;
wherein the comparison between the subcarrier spacing of the second carrier and the subcarrier spacing of the third carrier comprises determining a common slot length or OFDM symbol duration of the second carrier and the third carrier; or
the comparison between the subcarrier spacing of the second carrier and the subcarrier spacing of the third carrier is determined based on a slot length or OFDM symbol duration of a smaller subcarrier spacing between the second carrier and the third carrier; and
wherein the first carrier is an SRS switch-from carrier, the second carrier is a switched-to carrier, the third carrier is an SRS carrier switching indication carrier.

12. The terminal according to claim 11, wherein:
the start slot location on the second carrier for transmission of the SRS is determined based on the comparison between the subcarrier spacing of the second carrier and the subcarrier spacing of the third carrier and a radio frequency capability parameter of the terminal device; and/or
the start symbol location on the second carrier for transmission of the SRS is determined based on the comparison between the subcarrier spacing of the second carrier and the subcarrier spacing of the third carrier and a radio frequency capability parameter of the terminal device.

13. The terminal according to claim 11, wherein the slot information comprises a plurality of slot configuration, wherein the plurality of slot configuration occupied by the SRS are aperiodic, and the plurality of slot configuration is triggered by radio resource control layer, RRC, signaling.

14. A network device, comprising:
a memory, configured to store a program; and a processor, configured to execute the program in the memory, the program comprising the steps of:
   determining configuration information for transmitting a sounding reference signal SRS, wherein the configuration comprises at least one of slot information or symbol information;
sending the configuration information to the terminal device;
sending an SRS request to the terminal device, for instructing the terminal device to switch, based on the configuration information and the SRS request, from a first carrier to a second carrier to transmit the SRS; wherein
a start slot location on the second carrier for transmission of the SRS is determined based on comparison between a subcarrier spacing of the second carrier and a subcarrier spacing of a third carrier; and/or
a start symbol location on the second carrier for transmission of the SRS is determined based on comparison between a subcarrier spacing of the second carrier and a subcarrier spacing of a third carrier;
wherein, the start slot location and start symbol location are determined further by a radio frequency parameter or a beamforming capability parameter sent to the network device:
wherein the comparison between the subcarrier spacing of the second carrier and the subcarrier spacing of the third carrier comprises determining a common slot length or OFDM symbol duration of the second carrier and the third carrier; or
the comparison between the subcarrier spacing of the second carrier and the subcarrier spacing of the third carrier is determined based on a slot length or OFDM symbol duration of a smaller subcarrier spacing between the second carrier and the third carrier, and
wherein the first carrier is a switch-from carrier, the second carrier is a switched-to carrier, the third carrier is a switching indication carrier.

* * * * *